US012598376B2

(12) United States Patent
Umejima

(10) Patent No.: US 12,598,376 B2
(45) Date of Patent: Apr. 7, 2026

(54) CAMERA SYSTEM, COMMUNICATION METHOD, SIGNAL PROCESSING DEVICE, AND CAMERA FOR COMMUNICATING VIA DIFFERENT TYPES OF WIRELESS COMMUNICATION

(71) Applicant: SONY GROUP CORPORATION, Tokyo (JP)

(72) Inventor: Masayuki Umejima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 492 days.

(21) Appl. No.: 17/910,232

(22) PCT Filed: Mar. 18, 2021

(86) PCT No.: PCT/JP2021/011046
§ 371 (c)(1),
(2) Date: Jan. 6, 2023

(87) PCT Pub. No.: WO2021/193342
PCT Pub. Date: Sep. 30, 2021

(65) Prior Publication Data
US 2023/0232097 A1 Jul. 20, 2023

(30) Foreign Application Priority Data
Mar. 27, 2020 (JP) ................................. 2020-057133

(51) Int. Cl.
*H04N 23/661* (2023.01)
*G08C 17/02* (2006.01)
(52) U.S. Cl.
CPC ........... *H04N 23/662* (2023.01); *G08C 17/02* (2013.01)

(58) Field of Classification Search
CPC .... H04N 23/662; H04N 23/661; H04N 23/60; G08C 17/02
USPC ....................................................... 348/211.2
See application file for complete search history.

(56) References Cited

U.S. PATENT DOCUMENTS

| | | | | |
|---|---|---|---|---|
| 5,303,050 A | | 4/1994 | Nishimura et al. | |
| 6,122,526 A | * | 9/2000 | Parulski | H04N 21/41407 |
| | | | | 348/E5.029 |
| 7,653,296 B2 | * | 1/2010 | Wakamizu | G03B 29/00 |
| | | | | 396/56 |
| 8,890,954 B2 | * | 11/2014 | O'Donnell | G08B 13/19682 |
| | | | | 348/157 |
| 11,533,642 B2 | * | 12/2022 | Raleigh | H04L 67/51 |
| 2010/0080202 A1 | * | 4/2010 | Hanson | H04W 12/084 |
| | | | | 370/338 |

(Continued)

FOREIGN PATENT DOCUMENTS

| | | |
|---|---|---|
| CN | 101098408 A | 1/2008 |
| CN | 101102404 A | 1/2008 |

(Continued)

*Primary Examiner* — Usman A Khan
(74) *Attorney, Agent, or Firm* — Paratus Law Group, PLLC

(57) ABSTRACT

A camera system according to the present disclosure includes a camera having a wireless communication function and configured to capture a video, and a signal processing device having a wireless communication function and configured to perform signal processing related to the video captured by the camera, and the camera and the signal processing device are wirelessly connected.

19 Claims, 19 Drawing Sheets

(56)　　　　References Cited

U.S. PATENT DOCUMENTS

| | | | |
|---|---|---|---|
| 2011/0052165 A1* | 3/2011 | Watanabe | G03B 17/00 |
| | | | 396/56 |
| 2013/0229539 A1 | 9/2013 | Watanabe et al. | |
| 2014/0043485 A1* | 2/2014 | Bateman | H04L 65/1069 |
| | | | 348/159 |
| 2014/0063469 A1* | 3/2014 | Folcik | H04N 5/222 |
| | | | 353/94 |
| 2014/0184831 A1 | 7/2014 | Watanabe et al. | |
| 2015/0312467 A1* | 10/2015 | Lee | H04W 68/00 |
| | | | 348/211.2 |
| 2016/0088209 A1* | 3/2016 | Tanaka | H04N 23/632 |
| | | | 348/211.8 |
| 2016/0094773 A1* | 3/2016 | Maciuca | H04N 23/62 |
| | | | 348/207.11 |
| 2017/0223252 A1 | 8/2017 | Tanaka et al. | |
| 2018/0063563 A1* | 3/2018 | Calvert | H04N 21/2187 |
| 2018/0241966 A1 | 8/2018 | Reznik | |
| 2018/0310033 A1* | 10/2018 | Johnson | H04N 21/43072 |
| 2018/0343379 A1* | 11/2018 | Suwa | G08B 13/19658 |

FOREIGN PATENT DOCUMENTS

| | | | |
|---|---|---|---|
| CN | 104378541 A | 2/2015 |
| CN | 105450925 A | 3/2016 |
| EP | 0516378 A1 | 12/1992 |
| JP | H04-348674 A | 12/1992 |
| JP | 2001-292348 A | 10/2001 |
| JP | 2003-018272 A | 1/2003 |
| JP | 2008-011474 A | 1/2008 |
| JP | 2010-124097 A | 6/2010 |
| JP | 2011-049857 A | 3/2011 |
| JP | 2011-130234 A | 6/2011 |
| JP | 2011-223630 A | 11/2011 |
| JP | 2011-234347 A | 11/2011 |
| JP | 2013-135427 A | 7/2013 |
| JP | 2013-179609 A | 9/2013 |
| JP | 2014-103684 A | 6/2014 |
| JP | 2016-066898 A | 4/2016 |
| KR | 10-2016-0035996 A | 4/2016 |

* cited by examiner

FIG.2

```
            ( START )
                |
                v
+-------------------------------+
|        EXECUTE IMAGING        |~S101
+-------------------------------+
                |
                v
+-------------------------------+
|   EXECUTE SIGNAL PROCESSING   |~S102
|       RELATED TO VIDEO        |
+-------------------------------+
                |
                v
            ( END )
```

CCU
(SIGNAL PROC-
ESSING DEVICE)

200

CAM
(CAMERA)

CAMERA SYSTEM, COMMUNICATION METHOD, SIGNAL PROCESSING DEVICE, AND CAMERA FOR COMMUNICATING VIA DIFFERENT TYPES OF WIRELESS COMMUNICATION

CROSS REFERENCE TO PRIOR APPLICATION

This application is a National Stage Patent Application of PCT International Patent Application No. PCT/JP2021/011046 (filed on Mar. 18, 2021) under 35 U.S.C. § 371, which claims priority to Japanese Patent Application No. 2020-057133 (filed on Mar. 27, 2020), which are all hereby incorporated by reference in their entirety.

FIELD

The present disclosure relates to a camera system, a communication method, a signal processing device, and a camera.

BACKGROUND

Camera systems are used for various applications such as broadcasting. In such a camera system, a camera (CAM) and a signal processing device such as a camera control unit (CCU) are connected in a wired manner via a camera cable or the like.

CITATION LIST

Patent Literature

Patent Literature 1: JP 2001-292348 A
Patent Literature 2: JP 2011-234347 A

SUMMARY

Technical Problem

However, in the related art, the camera and the signal processing device are connected in a wired manner via a camera cable or the like, and thus, in order to prevent entanglement of the camera cable, or the like, another person who performs processing related to the cable is required other than a camera operator. In addition, the camera and the signal processing device are connected to each other in a wired manner, and thus, there has been a limitation on layout and a setting place of the camera depending on a length of the cable etc., or the like. As described above, the camera system in the related art, which has many restrictions such as installation of the camera, is a system having many restrictions for a user to use and is not a highly convenient system. It is therefore desired to improve a degree of freedom in installation of the camera.

The present disclosure therefore proposes a camera system, a communication method, a signal processing device, and a camera that can improve the degree of freedom in installation of the camera.

Solution to Problem

According to the present disclosure, a camera system includes a camera having a wireless communication function and configured to capture a video; and a signal processing device having a wireless communication function and configured to perform signal processing related to the video captured by the camera, wherein the camera and the signal processing device are wirelessly connected.

BRIEF DESCRIPTION OF DRAWINGS

FIG. 2 is a diagram illustrating a configuration example of a camera system according to the first embodiment of the present disclosure.

FIG. 7 is a sequence diagram illustrating an example of polling processing according to the first embodiment.

FIG. 9 is a diagram illustrating an example of a camera system and communication processing according to a second embodiment of the present disclosure.

DESCRIPTION OF EMBODIMENTS

Figure 1:
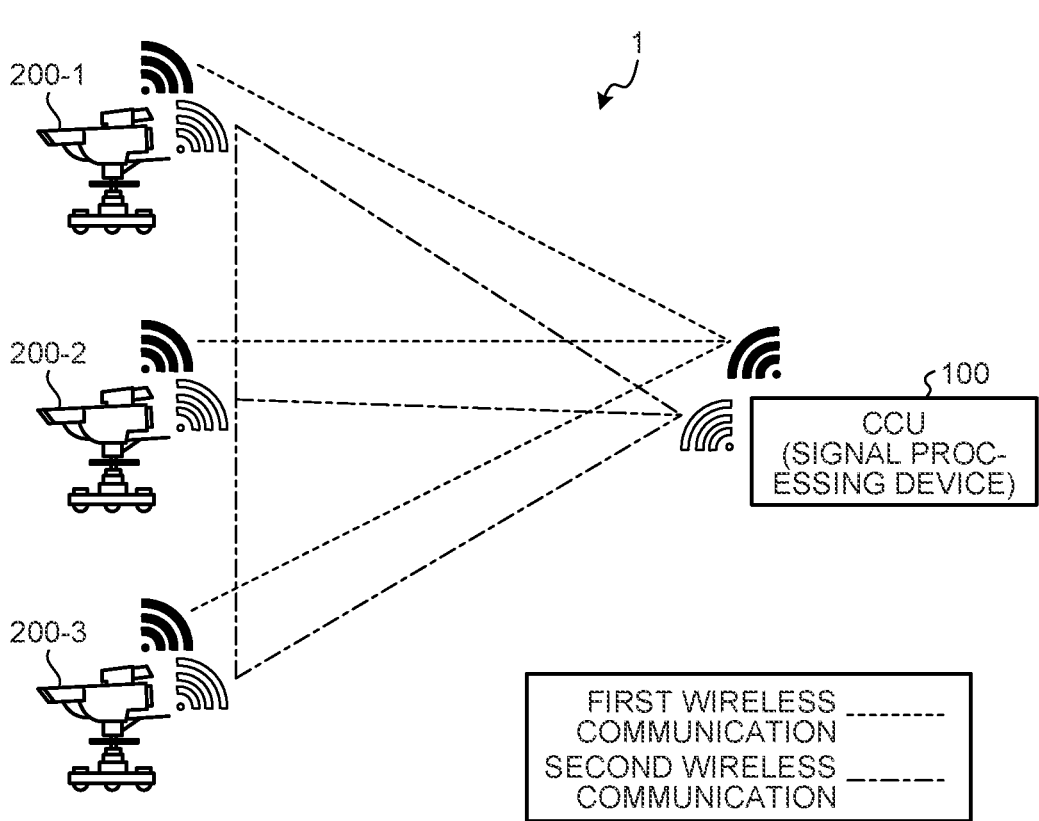
FIG. 1 is a diagram illustrating an example of communication processing according to a first embodiment of the present disclosure.

Embodiments of the present disclosure will be described in detail below with reference to the drawings. Note that a camera system, a communication method, a signal processing device, and a camera according to the present application are not limited by the embodiments. In each of the following embodiments, the same parts are denoted by the same reference numerals, and redundant description will be omitted.

The present disclosure will be described according to the following order of items.

1. First Embodiment
1-1. Outline of Communication Processing According to First Embodiment of Present Disclosure
1-1-1. Background and Effects etc.
1-1-2. First Wireless Communication and Second Wireless Communication
1-1-2-1. Fifth Generation Mobile Communications System (5G)
1-1-3. First Signal and Second Signal
1-2. Configuration of Camera System According to First Embodiment
1-2-1. Configuration of Signal Processing Device According to First Embodiment
1-2-2. Configuration of Camera According to First Embodiment
1-3. Procedure of Communication Processing According to First Embodiment
1-4. Antenna Arrangement Example of Signal Processing Device
1-4-1. First Arrangement Example (Front Arrangement)
1-4-2. Second Arrangement Example (Rear Arrangement)
1-4-3. Third Arrangement Example (Separation Arrangement)
1-5. Polling Processing
1-5-1. Polling Processing in Related Art 1-5-2. Polling Processing According to First embodiment
1-6. Communication Example in Case Where Master Camera is Determined
2. Second Embodiment
2-1. Outline of Camera System and Communication Processing According to Second Embodiment of Present Disclosure
2-2. 5G
2-2-1. Example 1 of 5G
2-2-2. Example 2 of 5G
3. Third Embodiment
3-1. Outline of Camera System and Communication Processing According to Third Embodiment of Present Disclosure
4. Fourth Embodiment
4-1. Outline of Camera System and Communication Processing According to Fourth Embodiment of Present Disclosure
5. Fifth Embodiment
5-1. Configuration of Camera System According to Fifth Embodiment of Present Disclosure
5-1-1. Configuration of Signal Processing Device According to Fifth Embodiment
5-2. Outline of Communication Processing According to Fifth Embodiment
5-3. Antenna Arrangement Example of Signal Processing Device
6. Sixth Embodiment
6-1. Outline of Camera System and Communication Processing According to Sixth Embodiment of Present Disclosure
7. Seventh Embodiment
7-1. Outline of Camera System and Communication Processing According to Seventh Embodiment of Present Disclosure
8. Eighth Embodiment
8-1. Outline of Camera System and Communication Processing According to Eighth Embodiment of Present disclosure
9. Ninth Embodiment
9-1. Outline of Camera System and Communication Processing According to Ninth Embodiment of Present Disclosure
10. Other Embodiments
10-1. Other Configuration Examples
10-2. Others
11. Effects According to Present Disclosure
12. Hardware Configuration

1. FIRST EMBODIMENT

1-1. Outline of Communication Processing According to First Embodiment of Present Disclosure FIG. 1 is a diagram illustrating an example of communication processing according to a first embodiment of the present disclosure. Furthermore, FIG. 1 is a diagram illustrating a configuration example of a camera system 1 according to the first embodiment of the present disclosure. Communication processing according to the first embodiment of the present disclosure is implemented by the camera system 1 illustrated in FIG. 1.

First, the configuration of the camera system 1 illustrated in FIG. 1 will be described. The camera system 1 is a system including a signal processing device 100 (hereinafter, also referred to as a "CCU 100") and a camera 200 (hereinafter, also referred to as a "CAM 200"). As illustrated in FIG. 1, the camera system 1 includes the CCU 100 and a plurality of CAMs 200. In a case where CAMs 200-1 to 200-3 and the like, are described without being particularly distinguished, they are referred to as the CAM 200. While FIG. 1 illustrates as an example of the CAM 200, a system camera to be used for capturing a video for broadcasting such as a television, details of the CAM 200 will be described later.

FIG. 1 illustrates the camera system 1 having a configuration in which a plurality of CAMs 200 is connected to the CCU 100, that is, a configuration in which a camera and a CCU are connected on an N-to-1 basis and illustrates a case where the CCU 100 is a multi connect CCU (M-CCU). In the example of FIG. 1, only three CAMs 200-1, CAM 200-2, and CAM 200-3 are illustrated, but the camera system 1 may include four or more CAMs 200. As described above, the number of cameras (CAMs 200) included in the camera system 1 is not limited to three cameras illustrated in FIG. 1 and may be determined by, for example, the connectable number according to a radio band, or the like.

Each CAM 200 captures a video. Each CAM 200 transmits the captured video (hereinafter, also referred to as a "main line video") to the CCU 100. The CCU 100 illustrated in FIG. 1 is a so-called camera control unit, and details of the CCU 100 will be described later. Each CAM 200 transmits a signal (hereinafter, also referred to as a "first signal") of the captured video (main line video) to the CCU 100 through first wireless communication. Each CAM 200 transmits the first signal (main line signal) to the CCU 100 through the first wireless communication indicated by a dotted line in FIG. 1. For example, the first signal (main line signal) is a video signal for recording.

In addition, each of the CAMs 200 and the CCU 100 communicate a signal other than the first signal (hereinafter, also referred to as a "second signal") through wireless communication different from the first wireless communication (hereinafter, also referred to as "second wireless communication"). The second signal mentioned here is a signal different from the first signal which is a signal of the main line video and is, for example, a signal to be used for controlling the CAM 200, and the like, and details thereof will be described later. In this manner, each of the CAMs 200 and the CCU 100 transmit and receive the signal (second signal) other than the signal of the main line video through the second wireless communication. Each of the CAMs 200 and the CCU 100 transmit and receive the second signal through the second wireless communication indicated by a dashed-dotted line in FIG. 1.

In addition, the CAMs 200 also communicate the second signal through the second wireless communication. As described above, the camera system 1 is a mesh network in which the CAMs 200 are also wirelessly connected to each other. In the example illustrated in FIG. 1, each of the CAMs 200 transmits and receives the second signal to and from other CAMs 200 through the second wireless communication indicated by a dashed-dotted line.

The first wireless communication for communicating the main line video is wireless communication having a wide bandwidth, high reliability, and a low delay. For example, the first wireless communication is communication that satisfies at least one of a wider bandwidth than a bandwidth of the second wireless communication, higher reliability than reliability of the second wireless communication, or a lower delay than a delay of the second wireless communication.

In the example illustrated in FIG. 1, the first wireless communication is wireless communication (5G communication) by the fifth generation mobile communications system (hereinafter, also referred to as "5G"), and the second wireless communication is wireless communication (4G communication) by the fourth generation mobile communications system (hereinafter, also referred to as "4G"). As described above, in the camera system 1 illustrated in FIG. 1, the main line video is communicated through the first wireless communication having higher speed and a lower delay than those of the second wireless communication. Note that the above is an example, and the first wireless communication may be any communication as long as the first wireless communication satisfies at least one of a wider bandwidth than the bandwidth of the second wireless communication, higher reliability than the reliability of the second wireless communication, or a lower delay than the delay of the second wireless communication. Details of this point will be described later.

As described above, in the camera system 1, communication between the CCU 100 and the CAM 200 is wireless communication, and communication is performed using the first wireless communication for communicating the main line video and using the second wireless communication for communicating other information.

1-1-1. Background and Effects Etc.

In a camera system in the related art, wired connection by optical composite cables is used between a camera and a signal processing device such as a CCU. The composite cables used in the wired connection are heavy in weight and thick in thickness, and thus, are difficult to handle. In addition, due to the wired connection, there is also a limitation on layout of the camera and the setting place depending on the cable length. Furthermore, when the camera is moved, it is necessary to perform processing so that the composite cables are not entangled. Thus, cable processing personnel are required in addition to a camera operator, which also causes a problem that it is difficult to prevent increase in operation cost at the time of imaging.

On the other hand, in the camera system 1, the CCU 100 and the CAM 200 are connected through wireless communication, so that it is possible to solve the problem due to priority connection as described above, and the degree of freedom in installation of the camera is improved. As a result, in the camera system 1, convenience of a user who uses the camera system 1 can be improved. In addition, in the camera system 1, a plurality of CAMs 200 can be controlled by one CCU 100 by wirelessly connecting the CCU 100 and the CAM 200. Furthermore, in the camera system 1, the camera and the CCU are wirelessly connected, the main line video is communicated through the first wireless communication, and the other information is communicated through the second wireless communication. As described above, in the camera system 1, by separating a main line video system (first wireless communication) and a wireless system (second wireless communication) such as synchronization and a command other than the main line video, it is possible to reduce interference of both communications.

Furthermore, in the camera system 1, by adopting a mesh network in which the CAMs 200 are also wirelessly connected to each other in the configuration of the second wireless communication, more stable connection can be secured. In addition, the wireless system (second wireless communication) other than the main line video does not require a band equivalent to that of the main line video system (first wireless communication), so that the camera system 1 can use a band narrower than that of the first wireless communication for the second wireless communication.

1-1-2. First Wireless Communication and Second Wireless Communication

As described above, the first wireless communication may be any communication as long as the communication satisfies at least one of a wider bandwidth, higher reliability, or a lower delay than those of the second wireless communication.

For example, the first wireless communication may be any communication as long as the communication has a wider bandwidth than the bandwidth of the second wireless communication. For example, the first wireless communication and the second wireless communication may be the same communication scheme, and the first wireless communication may have a wider bandwidth than the bandwidth of the second wireless communication. For example, the first wireless communication and the second wireless communication may be 4G communication.

1-1-2-1. Fifth Generation Mobile Communications System (5G)

Furthermore, for example, the first wireless communication and the second wireless communication may be 5G communication. For example, the camera system 1 may use a technique related to network slicing for virtually slicing (dividing) a network. The camera system 1 may use a technique related to network slicing to divide information to be transmitted according to bands. For example, the camera system 1 may perform communication by setting a wider bandwidth for the first wireless communication than the bandwidth of the second wireless communication using the technique related to network slicing.

1-1-3. First Signal and Second Signal

As described above, the first signal to be transmitted and received through the first wireless communication is the main line video. On the other hand, the second signal to be transmitted and received through the second wireless communication is various kinds of signals (information) other than the main line video. Examples of the second signal will be described below.

For example, the second signal is a signal related to imaging by the CAM 200. The second signal is a signal to be used for controlling the CAM 200. The second signal is a synchronization signal for synchronizing the CAMs 200. The synchronization signal is, for example, a GENLOCK signal, and is a signal for causing a plurality of cameras (CAMs 200) to operate in synchronization with each other. For example, the synchronization signal is transmitted from the signal processing device such as the CCU 100 to the CAM 200.

The second signal is a signal of a command (command signal) for controlling the CAM 200. The command signal also includes a response from the CAM 200 to the CCU 100. The second signal is a control signal for controlling a diaphragm of the CAM 200, a white level and a black level of the video signal, color tone, and the like. For example, the command signal for controlling the CAM 200 is transmitted from the signal processing device such as the CCU 100 to the CAM 200. For example, a response signal from the CAM 200 to the CCU 100 is transmitted from the CAM 200 to the signal processing device such as the CCU 100.

The second signal is a signal to be used for information transmission between users using the camera system 1. The second signal is a signal of a video having resolution lower than that of the main line video. The second signal is a signal of an RET image (RET image signal). The RET image signal is a video signal to be used by an operator (camera operator) of the CAM 200 to confirm an image or the like, of a camera (CAM 200) other than the own camera of the operator. The RET image does not require resolution as high as that of the main line video. The RET image is a video having resolution lower than that of the main line video. For example, the RET image is displayed on a viewfinder (VF) or the like of the CAM 200. For example, the RET image signal is transmitted from one CAM 200 to another CAM 200.

In the related art, the RET image is communicated via the CCU, and thus, communicated through a path (path via the CCU) from the camera to the CCU and from the CCU to another camera. On the other hand, in the camera system 1, the CAMs 200, that is, the cameras can directly communicate with each other, so that the RET image can be communicated between the CAMs 200 without using the path via the CCU.

The second signal is a signal of a speech of the user. The second signal is an INCOM signal (INCOM signal). The INCOM signal is a speech signal to be used by users who use the camera system 1 such as staff members to talk with each other. For example, the INCOM signal is transmitted from the signal processing device such as the CCU 100 to the CAM 200. For example, the INCOM signal is transmitted from the CAM 200 to the signal processing device such as the CCU 100. For example, the INCOM signal is transmitted from one CAM 200 to another CAM 200. The INCOM signal is transmitted from one CAM 200 to another CAM 200 different from the one CAM 200.

The second signal is a signal to be used for information transmission to an imaging subject by the CAM 200. The second signal is a signal for indicating a status of the CAM 200 to the imaging subject. The second signal is a TALLY signal (TALLY signal). For example, the TALLY signal is a signal indicating which camera (CAM 200) captures a video of the imaging subject such as a performer. For example, the TALLY signal is transmitted from the signal processing device such as the CCU 100 to the CAM 200.

For example, during OA (ON AIR) or REC (Record), a TALLY lamp (light emitting unit) of the CAM 200 lights up in red. For example, while the video is recorded although not used for OA, the TALLY lamp (light emitting unit) of the CAM 200 lights up in green. For example, in a case where a relay destination is different, the TALLY lamp (light emitting unit) of the CAM 200 lights up in yellow. Note that the color described above is an example, the emission color is not limited to the above, and each color may indicate various meanings.

The second signal is a signal to be used for information transmission to an imaging subject by the CAM 200. The second signal is a signal of character information to be notified to the imaging subject. The second signal is a signal of a prompter (prompter signal). The prompter signal is a video signal for projecting a cue card to the imaging subject such as a performer. The prompter does not require resolution as high as that of the main line video. The prompter is a video having resolution lower than that of the main line video. For example, the prompter signal is transmitted from the signal processing device such as the CCU 100 to the CAM 200. For example, the prompter signal continues to be transmitted during OA.

Note that the above is an example, and the first signal and the second signal may be appropriately set according to purposes or applications of the camera system 1. In other words, the first signal and the second signal may include any type of signal depending on the purposes and applications of the camera system 1.

1-2. Configuration of Camera System According to First Embodiment

Figure 2:
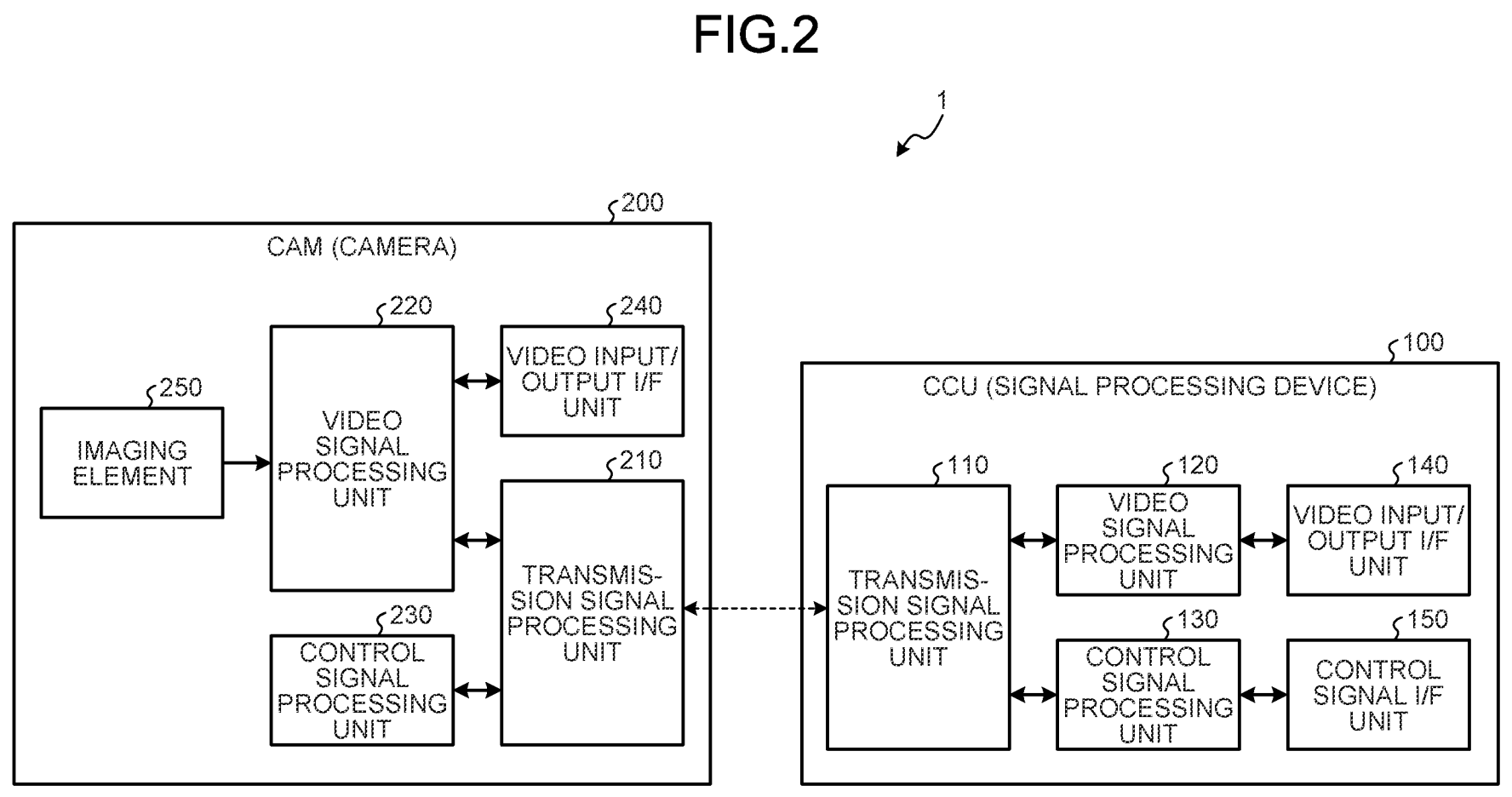

The camera system 1 illustrated in FIG. 2 will be described. As illustrated in FIG. 2, the camera system 1 includes the CCU 100 and the CAM 200. The CAM 200 and the CCU 100 are wirelessly connected via a predetermined communication network (network) so as to be able to perform communication with each other. FIG. 2 is a diagram illustrating a configuration example of the camera system according to the first embodiment. Note that the camera system 1 illustrated in FIG. 2 may include a plurality of CAMs 200 and a plurality of CCUs 100. For example, the example of FIG. 1 illustrates a case where the camera system 1 illustrated in FIG. 2 includes three CAMs 200. Furthermore, the camera system 1 is not limited to the CCU 100 and the CAM 200 and may include various components. Details of these points will be described later.

The CCU 100 is also referred to as a camera control unit and is an information processing device to be used to perform control related to the camera. Furthermore, the CCU 100 is a signal processing device that has a wireless communication function and performs signal processing related to the video captured by the camera. For example, the CCU 100 communicates with the camera and supplies power and a reference signal to the camera. Furthermore, for example, the CCU 100 receives a signal from the camera, performs processing on the received signal and outputs a signal in a predetermined format. For example, the CCU 100 has a function of controlling a diaphragm of the camera, a white level and a black level of a video signal, color tone, and the like. For example, the CCU 100 transmits, to the camera, a control signal for controlling the diaphragm of the camera, the white level and the black level of the video signal, the color tone, and the like.

The CCU 100 has a wireless communication function and performs signal processing related to the video captured by the CAM 200. The CCU 100 is wirelessly connected to the CAM 200. The CCU 100 communicates, with the CAM 200, the first signal that is a signal of the video captured by the CAM 200 through the first wireless communication. The CCU 100 receives the signal of the video captured by the CAM 200 from the CAM 200 through the first wireless communication.

The CCU 100 communicates the second signal other than the first signal with the CAM 200 through the second wireless communication different from the first wireless communication. The CCU 100 transmits and receives the second signal other than the first signal to and from the CAM 200 through the second wireless communication.

The CCU 100 communicates with the CAM 200 through the first communication that satisfies at least one of a wider bandwidth than the bandwidth of the second wireless communication, higher reliability than the reliability of the second wireless communication, or a lower delay than the delay of the second wireless communication. The CCU 100 communicates the second signal with the CAM 200 through the second wireless communication which is 4G communication and communicates the first signal with the CAM 200 through the first wireless communication which is 5G communication.

The CCU 100 communicates a signal related to imaging by the CAM 200 with the CAM 200. The CCU 100 communicates a signal to be used for controlling the CAM 200 with the CAM 200. The CCU 100 communicates, with the CAM 200, a synchronization signal with another CAM 200 or a signal of a command for controlling the CAM 200.

The CCU 100 communicates a signal to be used for information transmission between users who use the camera system 1 with the CAM 200. The CCU 100 communicates, with the CAM 200, a signal of a video having resolution lower than that of the video (main line video) captured by the CAM 200 or a signal of a speech of the user. The CCU 100 communicates the RET image signal or the INCOM signal with the CAM 200.

The CCU 100 communicates a signal to be used for information transmission to the imaging subject by the CAM 200 with the CAM 200. The CCU 100 communicates, with the CAM 200, a signal for indicating the status of the CAM 200 to the imaging subject or a signal of character information to be notified to the imaging subject. The CCU 100 communicates a TALLY signal or a prompter signal with the CAM 200.

The CCU 100 communicates with the plurality of CAMs 200 through the first wireless communication and the second wireless communication. The CCU 100 identifies a manufacturer of the CAM 200 at the time of wireless connection with the CAM 200. The CCU 100 receives information for identifying the manufacturer of the CAM 200 from the CAM 200. For example, the CCU 100 requests information for identifying the manufacturer of the CAM 200 from the CAM 200.

The CAM 200 is a camera that captures a video. For example, the CAM 200 is a system camera to be used for capturing a video for broadcasting such as a television. For example, the CAM 200 is a system camera to be used in a shooting studio, a stadium, or the like. The CAM 200 has a wireless communication function and functions as a camera that captures a video.

The CAM 200 is wirelessly connected to the CCU 100. The CAM 200 communicates, with the CCU 100, the first signal that is a signal of the video captured by the CAM 200 through the first wireless communication. The CAM 200 transmits the signal of the video captured by the CAM 200 to the CCU 100 through the first wireless communication.

The CAM 200 communicates the second signal other than the first signal with the CCU 100 through the second wireless communication different from the first wireless communication. The CAM 200 transmits and receives the second signal other than the first signal to and from the CCU 100 through the second wireless communication.

The CAM 200 performs communication with the CCU 100 through the first communication that satisfies at least one of a wider bandwidth than the bandwidth of the second wireless communication, higher reliability than the reliability of the second wireless communication, or a lower delay than the delay of the second wireless communication. The CAM 200 communicates the second signal with the CCU 100 through the second wireless communication which is 4G communication and communicates the first signal with the CCU 100 through the first wireless communication which is 5G communication.

The CAM 200 communicates a signal related to imaging by the CAM 200 with the CCU 100. The CAM 200 communicates a signal to be used for controlling the CAM 200 with the CCU 100. The CAM 200 communicates, with the CCU 100, a synchronization signal for achieving synchronization with another CAM 200 or a signal of a command for controlling the CAM 200.

The CAM 200 communicates a signal to be used for information transmission between users who use the camera system 1 with the CCU 100. The CAM 200 communicates, with the CCU 100, a signal of a video having resolution lower than that of the video (main line video) captured by the CAM 200 or a signal of a speech of the user. The CAM 200 communicates the RET image signal or the INCOM signal with the CCU 100.

The CAM 200 communicates a signal to be used for information transmission to the imaging subject by the CAM 200 with the CCU 100. The CAM 200 communicates, with the CCU 100, a signal for indicating the status of the CAM 200 to the imaging subject or a signal of character information to be notified to the imaging subject. The CAM 200 communicates a TALLY signal or a prompter signal with the CCU 100.

The CAM 200 communicates with other CAMs 200 through the second wireless communication. The CAM 200 transmits information for identifying a manufacturer of the CAM 200 to the CCU 100. The CAM 200 transmits information for identifying the manufacturer of the CAM 200 to the CCU 100 at the time of wireless connection with the CCU 100. For example, the CAM 200 transmits information for identifying the manufacturer of the CAM 200 to the CCU 100 in response to a request for the information for identifying the manufacturer from the CCU 100.

1-2-1. Configuration of Signal Processing Device According to First Embodiment Next, a configuration of the CCU 100 according to the first embodiment will be described. Note that FIG. 2 illustrates only a configuration related to communication processing among the components of the CCU 100.

Figure 4:
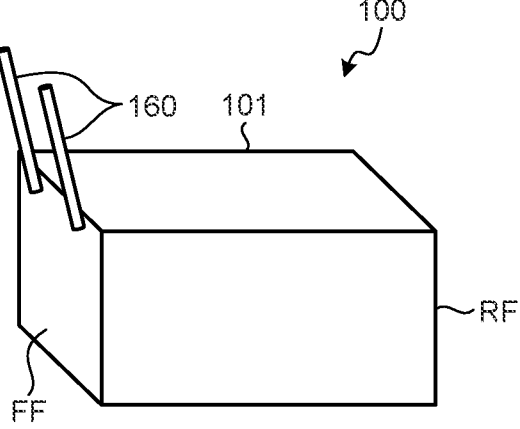
FIG. 4 is a diagram illustrating an example of antenna arrangement of a signal processing device.

As illustrated in FIG. 2, the CCU 100 includes a transmission signal processing unit 110, a video signal processing unit 120, a control signal processing unit 130, a video input/output I/F unit 140, a control signal I/F unit 150, and an antenna unit 160 (see FIG. 4).

The transmission signal processing unit 110 functions as a communication unit that transmits and receives signals. The transmission signal processing unit 110 functions as a wireless communication unit that performs wireless communication with a camera that captures a video.

The transmission signal processing unit 110 is implemented by, for example, a network interface card (NIC), a communication circuit, or the like. The transmission signal processing unit 110 transmits and receives signals (information) to and from the CAM 200 through wireless communication. Furthermore, the transmission signal processing unit 110 may be connected to a predetermined network in a wired or wireless manner and may transmit and receive information to and from other devices or the like via the predetermined network. The transmission signal processing unit 110 receives a signal from the CAM 200. The transmission signal processing unit 110 receives a video (signal) from the CAM 200.

The transmission signal processing unit 110 controls communication. The transmission signal processing unit 110 controls communication with other devices such as the CAM 200. The transmission signal processing unit 110 controls communication with external information processing devices. The transmission signal processing unit 110 controls communication with the CAM 200.

Note that, in a case where communication is performed with other cameras that perform communication in a wired manner, the CCU 100 may have a connector portion to be used for wired connection with the cameras. The CCU 100 is connected to the cameras in a wired manner by connecting camera cables or the like connected to the cameras to the connector portion. In this case, the transmission signal processing unit 110 controls communication with the cameras connected by the camera cables or the like via the connector portion. Note that the camera cables here may be various cables such as optical composite cables, optical fiber cables, and twisted pair cables.

The CCU 100 includes a storage unit. The storage unit is implemented by, for example, a semiconductor memory element such as a random access memory (RAM) and a flash memory, or a storage device such as a hard disk and an optical disk. The storage unit stores various kinds of information. The storage unit stores various kinds of information to be used for signal processing.

The video signal processing unit 120 is implemented by, for example, a central processing unit (CPU), a micro processing unit (MPU), or the like, executing a program (for example, a signal processing program related to a video) stored in the CCU 100 using a random access memory (RAM) or the like as a work area. Furthermore, the video signal processing unit 120 may be implemented by, for example, an integrated circuit such as an application specific integrated circuit (ASIC) and a field programmable gate array (FPGA).

The video signal processing unit 120 performs various kinds of signal processing. The video signal processing unit 120 performs signal processing related to a video. The video signal processing unit 120 functions as a signal processing unit that performs signal processing related to the video captured by the camera. The video signal processing unit 120 executes signal processing related to the video according to a control signal.

The video signal processing unit 120 performs video signal processing (image processing) on a signal received by the transmission signal processing unit 110. The video signal processing unit 120 executes various kinds of video signal processing. The video signal processing unit 120 performs video signal processing on a signal and generates a signal in a predetermined format. For example, the video signal processing unit 120 performs processing related to demosaic. For example, the video signal processing unit 120 performs processing related to noise removal. For example, video signal processing unit 120 performs processing related to gamma correction. For example, the video signal processing unit 120 performs processing related to brightness adjustment. For example, the video signal processing unit 120 performs processing related to adjustment of white balance. For example, the video signal processing unit 120 performs processing related to gain adjustment.

Note that the above is an example, and the video signal processing unit 120 is not limited to the above and executes various kinds of video signal processing. For example, the video signal processing unit 120 may perform part of the video signal processing to be performed by the CAM 200 (video signal processing unit 220).

The control signal processing unit 130 is implemented by, for example, a CPU, an MPU, or the like, executing a program (for example, a signal processing program related to control) stored in the CCU 100 using the RAM or the like as a work area. Furthermore, the control signal processing unit 130 may be implemented by, for example, an integrated circuit such as an ASIC or an FPGA.

The control signal processing unit 130 performs signal processing related to control. The control signal processing unit 130 performs signal processing related to control of the CAM 200. The control signal processing unit 130 performs signal processing related to control of the CCU 100. Furthermore, the control signal processing unit 130 performs signal processing related to control of the camera. The control signal processing unit 130 generates a control signal (control information) for controlling the camera. The control signal processing unit 130 performs signal processing related to control of the CAM 200. The control signal processing unit 130 generates a control signal for controlling the CAM 200.

The control signal processing unit 130 generates a signal of a command for controlling the camera. The control signal processing unit 130 generates a control signal for adjusting the diaphragm of the camera.

The control signal processing unit 130 controls the CAM 200 by transmitting the control signal to the CAM 200 via the transmission signal processing unit 110. The control signal processing unit 130 controls the camera by transmitting the control signal to the camera via the transmission signal processing unit 110. The control signal processing unit 130 outputs the control signal to the CAM 200 via the transmission signal processing unit 110.

Note that the above is an example, and the control signal processing unit 130 is not limited to the above and executes various kinds of control signal processing. For example, the control signal processing unit 130 may perform part of the control signal processing to be performed by the CAM 200 (control signal processing unit 230).

The control signal processing unit 130 may be integrated with the video signal processing unit 120. For example, the video signal processing unit 120 and the control signal processing unit 130 may be implemented by the same processor.

The video input/output I/F unit 140 has a function as an input/output interface related to a video. The video input/output I/F unit 140 is an interface for connecting the CCU 100 and other information processing devices. The CCU 100 communicates information related to the video such as a video signal with other information processing devices via the video input/output I/F unit 140. Communication by the video input/output I/F unit 140 may be wired communication or wireless communication. For example, the CCU 100 transmits information related to the video such as a video signal to other information processing devices via the video input/output I/F unit 140. For example, the video input/output I/F unit 140 is connected to a switcher and transmits information regarding a video such as a video signal to the switcher. In addition, the video input/output I/F unit 140 may be connected to a storage device (database) and store information regarding a video such as a video signal in the storage device.

Note that the video input/output I/F unit 140 may have a function of displaying, for example, a graphical user interface (GUI) such as a menu, a button, and a cursor on a display (display screen). In addition, the video input/output I/F unit 140 may receive an input related to a video by the user through an interface such as a display, a keyboard, and a mouse. In this case, for example, the CCU 100 receives data from an input device such as a keyboard and a mouse via the video input/output I/F unit 140.

The control signal I/F unit 150 has a function as an interface of the control signal. The control signal I/F unit 150 is an interface for connecting the CCU 100 and other information processing devices. The CCU 100 communicates information related to control such as a control signal with other information processing devices via the control signal I/F unit 150. Communication by the control signal I/F unit 150 may be wired communication or wireless communication. For example, the CCU 100 receives information related to control such as a control signal from other information processing devices via the control signal I/F unit 150. For example, the control signal I/F unit 150 is connected to a switcher and receives information regarding control such as a control signal from the switcher.

Note that the control signal I/F unit 150 may have a function of displaying a graphical user interface (GUI) such as a menu, a button, and a cursor on a display (display screen). Furthermore, the control signal I/F unit 150 may receive an input related to control by the user through an interface such as a display, a keyboard, and a mouse. In this case, for example, the CCU 100 receives data from an input device such as a keyboard and a mouse via the control signal I/F unit 150.

The antenna unit 160 has a function of transmitting and receiving a radio wave. The antenna unit 160 radiates a signal output from the transmission signal processing unit 110 into space as a radio wave.

Furthermore, the antenna unit 160 converts a radio wave in space into a signal and outputs the signal to the transmission signal processing unit 110. Note that arrangement of the antenna unit 160 will be described later.

1-2-2. Configuration of Camera According to First Embodiment

Next, a configuration of the CAM 200 which is an example of the camera according to the first embodiment will be described. Note that FIG. 2 illustrates only a configuration related to communication processing among the components of the CAM 200. For example, in the configuration of the CAM 200, description of physical components for moving the CAM 200 will be omitted. In addition, physical components for adjusting an optical member such as a lens, a focus, a zoom, a diaphragm, and the like of the optical member will also be omitted.

As illustrated in FIG. 2, the CAM 200 includes a transmission signal processing unit 210, a video signal processing unit 220, a control signal processing unit 230, a video input/output I/F unit 240, and an imaging element 250.

The transmission signal processing unit 210 functions as a communication unit that transmits and receives a signal. The transmission signal processing unit 210 functions as a wireless communication unit that performs wireless communication between signal processing devices that perform signal processing related to a video.

The transmission signal processing unit 210 is implemented by, for example, an NIC, a communication circuit, or the like. The transmission signal processing unit 210 transmits and receives a signal (information) to and from the CCU 100 through wireless communication. Furthermore, the transmission signal processing unit 210 may be connected to a predetermined network in a wired or wireless manner and may transmit and receive information to and from other devices or the like via the predetermined network.

The transmission signal processing unit 210 controls communication. The transmission signal processing unit 210 controls communication with other devices such as the CCU 100. The transmission signal processing unit 210 controls communication between external information processing devices. The transmission signal processing unit 210 controls communication with the CCU 100. The transmission signal processing unit 210 transmits the video (signal) captured by the imaging element 250 to the CCU 100. The transmission signal processing unit 210 receives a control signal from the CCU 100. For example, the transmission signal processing unit 210 receives a control signal for controlling a diaphragm of the camera, a white level and a black level of the video signal, color tone, and the like, from the CCU 100.

The CAM 200 includes a storage unit. The storage unit, the storage unit is implemented by, for example, a semiconductor memory element such as a RAM and a flash memory or a storage device such as a hard disk and an optical disk. The storage unit stores various kinds of information. The storage unit stores various kinds of information to be used for signal processing.

The video signal processing unit 220 is implemented by, for example, a CPU, an MPU, or the like, executing a program (for example, a signal processing program related to a video) stored in the CAM 200 using the RAM or the like as a work area. Furthermore, the video signal processing unit 220 may be implemented by, for example, an integrated circuit such as an ASIC and an FPGA.

The video signal processing unit 220 performs various kinds of signal processing. The video signal processing unit 220 performs signal processing related to a video. The video signal processing unit 220 performs signal processing related to the video captured by the imaging element 250. The video signal processing unit 220 executes signal processing related to the video according to the control signal.

The video signal processing unit 220 performs video signal processing (image processing) on the video (signal) captured by the imaging element 250. The video signal processing unit 220 executes various kinds of video signal processing. The video signal processing unit 220 executes signal processing related to the video according to the control signal from the CCU 100. For example, the video signal processing unit 220 performs processing of adjusting a white level and a black level of the video signal. Furthermore, for example, the video signal processing unit 220 performs processing of adjusting color tone.

Note that the above is an example, and the video signal processing unit 220 is not limited to the above and executes various kinds of video signal processing. For example, the video signal processing unit 220 may perform part of the video signal processing to be performed by the CCU 100 (video signal processing unit 120).

The control signal processing unit 230 is implemented by, for example, a CPU, an MPU, or the like, executing a program (for example, a signal processing program related to control) stored in the CCU 100 using a RAM or the like as a work area. Furthermore, the control signal processing unit 230 may be implemented by, for example, an integrated circuit such as an ASIC and an FPGA.

The control signal processing unit 230 performs signal processing related to control. The control signal processing unit 230 performs signal processing related to control of the CAM 200. The control signal processing unit 230 controls the CAM 200 using control information. The control signal processing unit 230 receives a control signal from the CCU 100 via the transmission signal processing unit 210 and controls the CAM 200 using the received control information. The control signal processing unit 230 controls the diaphragm of the CAM 200 using the control signal received from the CCU 100. The control signal processing unit 230 controls the diaphragm of the CAM 200 using the control signal for adjusting the diaphragm of the camera received from the CCU 100. For example, the control signal processing unit 230 uses the control signal to instruct a component for adjusting an optical member such as a lens to perform adjustment corresponding to the control signal.

Note that the above is an example, and the control signal processing unit 230 is not limited to the above and executes various kinds of control signal processing. For example, the control signal processing unit 230 may perform part of the control signal processing to be performed by the CCU 100 (control signal processing unit 130).

The control signal processing unit 230 may be integrated with the video signal processing unit 220. For example, the video signal processing unit 220 and the control signal processing unit 230 may be implemented by the same processor.

The video input/output I/F unit 240 has a function as an input/output interface related to a video. The video input/output I/F unit 240 is an interface for connecting the CAM 200 and other information processing devices. The video input/output I/F unit 240 may have a function similar to that of the video input/output I/F unit 140.

The imaging element 250 functions as an imaging unit that captures a video. Note that the imaging unit may include an optical member such as a lens, an adjustment mechanism that performs adjustment regarding focus, zoom, and the diaphragm of the optical member, and the like. The imaging element 250 converts an image into an electric signal.

For example, a complementary metal oxide semiconductor (CMOS) image sensor is used as the imaging element 250. Note that the imaging element 250 is not limited to the CMOS image sensor, and various image sensors such as a charge coupled device (CCD) image sensor may be used.

The CAM 200 includes an antenna unit. The antenna unit has a function of transmitting and receiving a radio wave. The antenna unit radiates a signal output from the transmission signal processing unit 210 into space as a radio wave. Furthermore, the antenna unit converts a radio wave in space into a signal and outputs the signal to the transmission signal processing unit 210.

For example, the antenna unit is disposed behind the CAM 200. For example, the antenna unit is disposed at a position facing the imaging element 250. For example, the antenna unit is disposed in a direction opposite to the direction that the imaging element 250 faces. For example, the antenna unit is disposed on a side opposite to a side on which the imaging element 250 is disposed. For example, the antenna unit is disposed on a rear side opposite to a front side on which the imaging element 250 is disposed.

1-3. Procedure of Communication Processing According to First Embodiment

Figure 3:
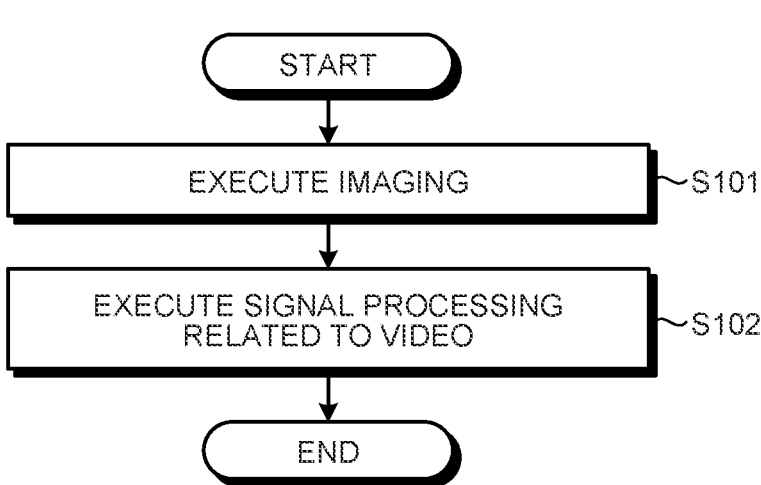
FIG. 3 is a flowchart illustrating an example of processing of the camera system according to the first embodiment.

Next, processing according to the first embodiment will be described with reference to FIG. 3. FIG. 3 is a flowchart illustrating an example of processing of the camera system according to the first embodiment.

As illustrated in FIG. 3, the CAM 200 executes imaging (step S101). For example, the CAM 200 captures a video by the imaging element 250. Then, the CAM 200 transmits the captured video to the CCU 100. The CAM 200 transmits the video to the CCU 100 through the first wireless communication.

The CCU 100 executes signal processing related to a video (step S102). The CCU 100 executes signal processing on the video acquired from the CAM 200.

1-4. Antenna Arrangement Example of Signal Processing Device

An antenna of the CCU 100 that is a signal processing device may be disposed in various manners. This point will be described with reference to FIGS. 4 to 6. Note that the CCU 100 may be in a use form of being disposed at a predetermined position or may be in a portable (portable) use form.

1-4-1. First Arrangement Example (Front Arrangement)

First, a first arrangement example of the antenna will be described with reference to FIG. 4. FIG. 4 is a diagram illustrating an example of antenna arrangement of the signal processing device.

In the example of FIG. 4, the antenna unit 160 of the CCU 100 is disposed on the front side of the CCU 100. The antenna unit 160 of the CCU 100 is disposed on the front surface FF side of a main body portion 101 of the CCU 100. In a case where the CCU 100 is stored in a shelf or the like, the antenna unit 160 of the CCU 100 is disposed on the front surface FF side disposed on the front surface side of the shelf or the like. For example, in a case where the CCU 100 is stored in a shelf or the like, the antenna unit 160 of the CCU 100 is disposed on the front surface FF side disposed to face the front of the shelf. The main body portion 101 of the CCU 100 is a chassis (case) that stores components (such as a processor and a memory) that implement the transmission signal processing unit 110, the video signal processing unit 120, the control signal processing unit 130, the video input/output I/F unit 140, the control signal I/F unit 150, the storage unit, and the like.

1-4-2. Second Arrangement Example (Rear Arrangement)

Figure 5:
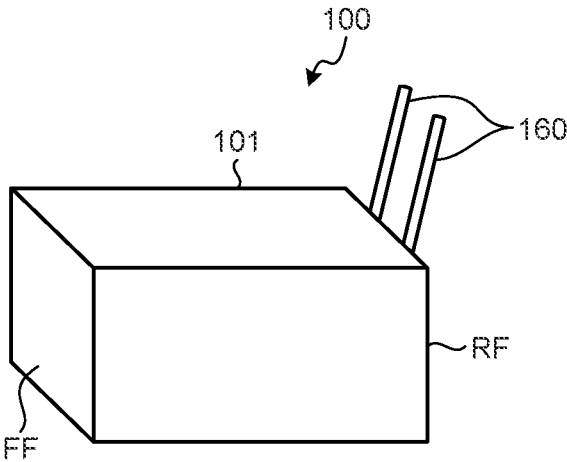
FIG. 5 is a diagram illustrating an example of the antenna arrangement of the signal processing device.

Next, a second arrangement example of the antenna will be described with reference to FIG. 5. FIG. 5 is a diagram illustrating an example of antenna arrangement of the signal processing device.

In the example of FIG. 5, the antenna unit 160 of the CCU 100 is disposed on the rear side of the CCU 100. The antenna unit 160 of the CCU 100 is disposed on the rear surface RF side of the main body portion 101 of the CCU 100. In a case where the CCU 100 is stored in a shelf or the like, the antenna unit 160 of the CCU 100 is disposed on the rear surface RF side disposed on the rear surface side of the shelf or the like. For example, in a case where the CCU 100 is stored in a shelf or the like, the antenna unit 160 of the CCU 100 is disposed on the rear surface RF side disposed to face the rear side of the shelf.

1-4-3. Third Arrangement Example (Separation Arrangement)

Figure 6:
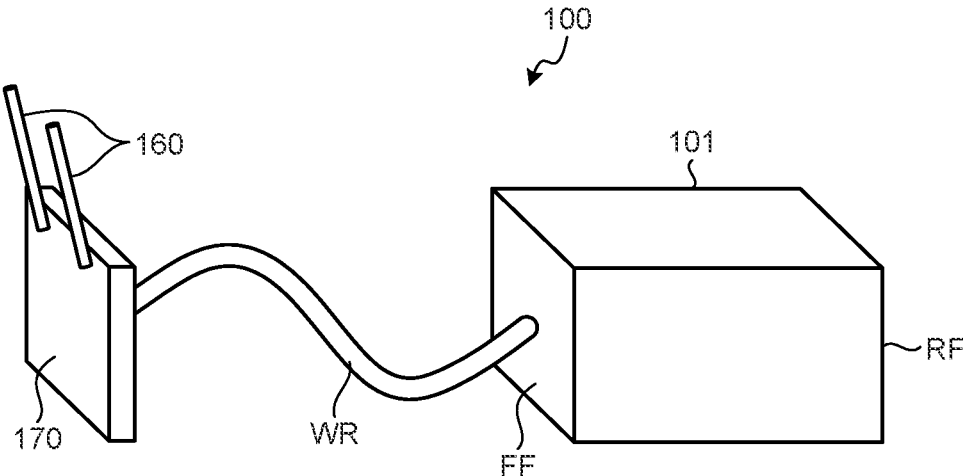
FIG. 6 is a diagram illustrating an example of the antenna arrangement of the signal processing device.

Next, a third arrangement example of the antenna will be described with reference to FIG. 6. FIG. 6 is a diagram illustrating an example of antenna arrangement of the signal processing device. In the third arrangement example, the antenna is separately disposed from the main body portion of the signal processing device.

The CCU 100 of FIG. 6 includes the main body portion 101 that performs signal processing and the antenna unit 160 that is separated from the main body portion 101 and performs wireless communication with the CAM 200. For example, the CCU 100 includes a separation portion 170 connected to the main body portion 101 with a cable WR in a wired manner. For example, the cable WR may be various cables such as an optical composite cable, an optical fiber cable, and a twisted pair cable. The antenna unit 160 is disposed in the separation portion 170 of the CCU 100, so that the antenna unit 160 can be disposed at a position separated from the main body portion 101. As a result, in the CCU 100 of FIG. 6, the degree of freedom in the arrangement of the antenna can be improved.

1-5. Polling Processing

Polling processing in the camera system will be described.

1-5-1. Polling Processing in Related Art

Figure 21:
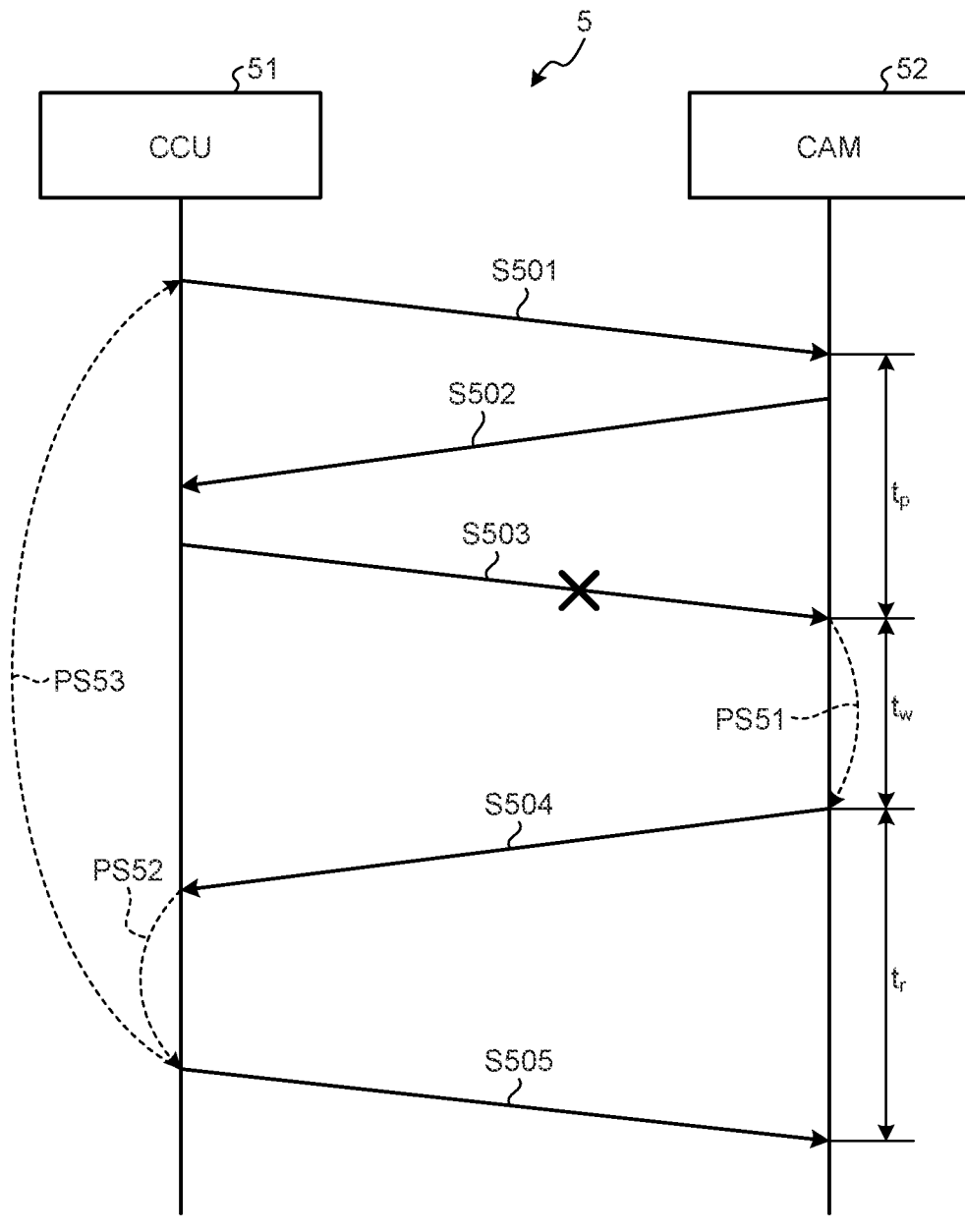
FIG. 21 is a sequence diagram illustrating polling processing in the related art.

First, flow of polling processing in a camera system in the related art will be described with reference to FIG. 21. FIG. 21 is a sequence diagram illustrating polling processing in the related art.

A system 5 in the related art, which is a camera system in the related art, includes a CCU 51 which is a signal processing device in the related art, and a CAM 52 which is a camera in the related art.

In FIG. 21, the CCU 51 confirms a CAM connection status (step S501). For example, the CCU 51 confirms, to the CAM 52, a connection status. Then, the CAM 52 responds to the CCU 51 that connection is OK (step S502). For example, the CAM 52 transmits information indicating that the connection to the CCU 51 has been established. Processing as illustrated in step S501 to step S502 is connection confirmation polling processing, and in the related art, data reciprocates once between the CAM and the CCU.

In addition, the CCU 51 confirms the CAM connection status (step S503). For example, an interval between step S501 and step S503 corresponds to a polling interval $t_p$. FIG. 21 illustrates a case where confirmation of the CAM connection status by the CCU 51 in step S503 is not transmitted to the CAM 52.

A predetermined period after the lapse of the polling interval $t_p$ in FIG. 21 corresponds to a timeout period $t_w$. For example, as illustrated in processing PS51, in a case where wireless connection is disconnected, a polling signal does not come, and thus, the CAM 52 performs timeout processing. The CAM 52 performs reconnection processing after the timeout. In FIG. 21, the CAM 52 requests reconnection processing (step S504). For example, the CAM 52 requests the reconnection processing after the timeout.

The CCU 51 returns a processing response to the reconnection request to the CAM 52 as illustrated in processing PS52. The CCU 51 returns a reconnection result to the CAM 52 (step S505). A reconnection period $t_r$ in FIG. 21 corresponds to a period (reconnection period) from when the reconnection processing request is issued until when a response of the reconnection result is received.

For example, in a case of an NG response, an error is displayed on a display unit on the CAM 52 side. In addition, in a case where reconnection is completed, the processing returns to the beginning of the polling sequence as illustrated in processing PS53. For example, in FIG. 21, the processing returns to step S501, and the processing is repeated. It takes the longest time to restore in a case where connection is disconnected immediately after the CAM 52 returns the connection OK. The shortest restoration period T in a case where wireless connection on the CAM 52 side is disconnected is "$t_p+t_w+t_r$".

As described above, in the system 5 in the related art, polling is performed from the master (CCU 51) side to the client (CAM 52) side. In other words, in the system 5 in the related art, the polling sequence is started from the master (CCU 51) side, which causes reciprocation of data necessary for polling and consumes a radio band. Whether or not the CAM 52 side is wirelessly connected can be determined only by whether or not there is a response to polling, and thus, the CCU 51 needs to confirm whether or not there is a reconnection request from the CAM 52.

1-5-2. Polling Processing According to First Embodiment

In contrast to the polling processing in the related art as described above, in the camera system 1, the CAM 200 starts conforming a state of wireless connection between the CAM 200 and the CCU 100. In other words, in the camera system 1, connection is made from the CAM 200 side (client side). In the polling processing according to the first embodiment, reconnection is automatically performed from the client (CAM 200).

Figure 7:
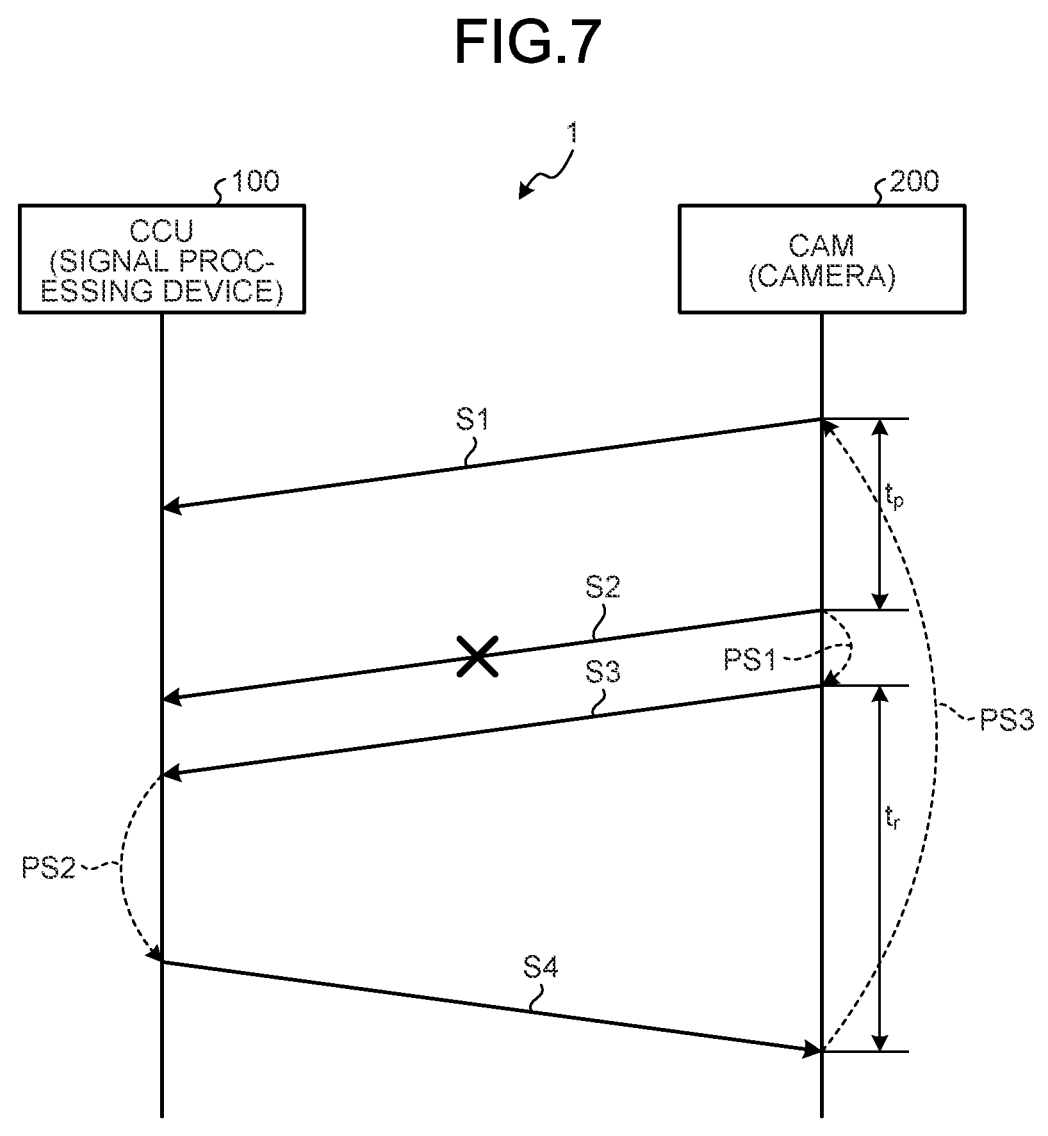

This point will be described with reference to FIG. 7. FIG. 7 is a sequence diagram illustrating an example of the polling processing according to the first embodiment. Flow of the polling processing according to the first embodiment will be described below. Note that description of points similar to those in FIG. 21 will be omitted as appropriate.

The CAM 200 transmits (returns) connection OK to the CCU 100 (step S1). For example, the CAM 200 transmits information indicating that connection to the CCU 100 has been established. In a case where the wireless connection is OK, the CAM 200 side does not need to know the state of the CCU 100, and thus, the CAM 200 unilaterally transmits an OK status to the CCU 100 side. As a result, the camera system 1 can prevent increase in a data amount (data communication amount) at the time of polling.

The CAM 200 transmits information indicating connection OK to the CCU 100 (step S2). For example, an interval between step S1 and step S2 corresponds to a polling interval $t_p$. FIG. 7 illustrates a case where the information indicating connection OK by the CAM 200 in step S2 is not transmitted to the CCU 100. For example, as indicated in processing PS1, in a case where wireless connection is disconnected, the CAM 200 determines that connection to the CCU 100 side is disconnected and performs reconnection processing. This eliminates the need of timeout processing because the camera system 1 does not wait for a polling response from the CCU 100 side. For example, an interval between step S2 and step S3 (a period of the processing PS1) can be set to a very short period (substantially 0).

The CAM 200 performs reconnection processing (step S3). The CAM 200 requests reconnection processing. For example, in a case where wireless connection is disconnected, the CAM 200 determines that connection to the CCU 100 side is disconnected and immediately performs the reconnection processing.

The CCU 100 returns a processing response to the reconnection request, to the CAM 200 as indicated in processing PS2. The CCU 100 returns a reconnection result to the CAM 200 (step S4). A reconnection period $t_r$ in FIG. 7 corresponds to a period (reconnection period) from when the reconnection processing request is issued until when a response of the reconnection result is received.

For example, in a case of an NG response, an error is displayed on the display unit on the CAM 200 side. In addition, in a case where reconnection is completed, the processing returns to the beginning of the polling sequence as indicated in processing PS3. For example, in FIG. 7, the processing returns to step S1 and the processing is repeated. It takes the longest time to restore when the CAM 52 is disconnected immediately before the CAM 52 returns the connection OK. The shortest restoration period T in a case where wireless connection on the CAM 200 side is disconnected is "$t_p+t_r$".

As illustrated in FIG. 7, in the camera system 1, the CAM 200 starts confirming a state of wireless connection between the CAM 200 and the CCU 100. For example, in the camera system 1, in a case where wireless connection on the CCU 100 side is disconnected and polling does not reach, a connection request is transmitted from the CCU 100 side to the CAM 200 side. Thus, in the camera system 1, when the CAM 200 side receives the connection request from the CCU 100 side, the processing only requires to shift from the polling operation to the connection response sequence and return to the polling operation after returning the response.

As described above, in the camera system 1, by starting the polling sequence from the CAM 200 side (client side), it is possible to prevent increase in a data reciprocation amount (data communication amount). In addition, in the camera system 1, the restoration period on the CAM 200 side can be shortened by starting the polling sequence from the CAM 200 side (client side). For example, it is not realistic for an operator (camera operator) of the CAM 200 to perform work of reconnection to the CCU 100. Furthermore, it is not realistic to perform similar work on the CCU

100 side (studio or the like). In the camera system 1, the reconnection work can be appropriately performed without performing such work.

1-6. Communication Example in Case Where Master Camera is Determined

Figure 8:
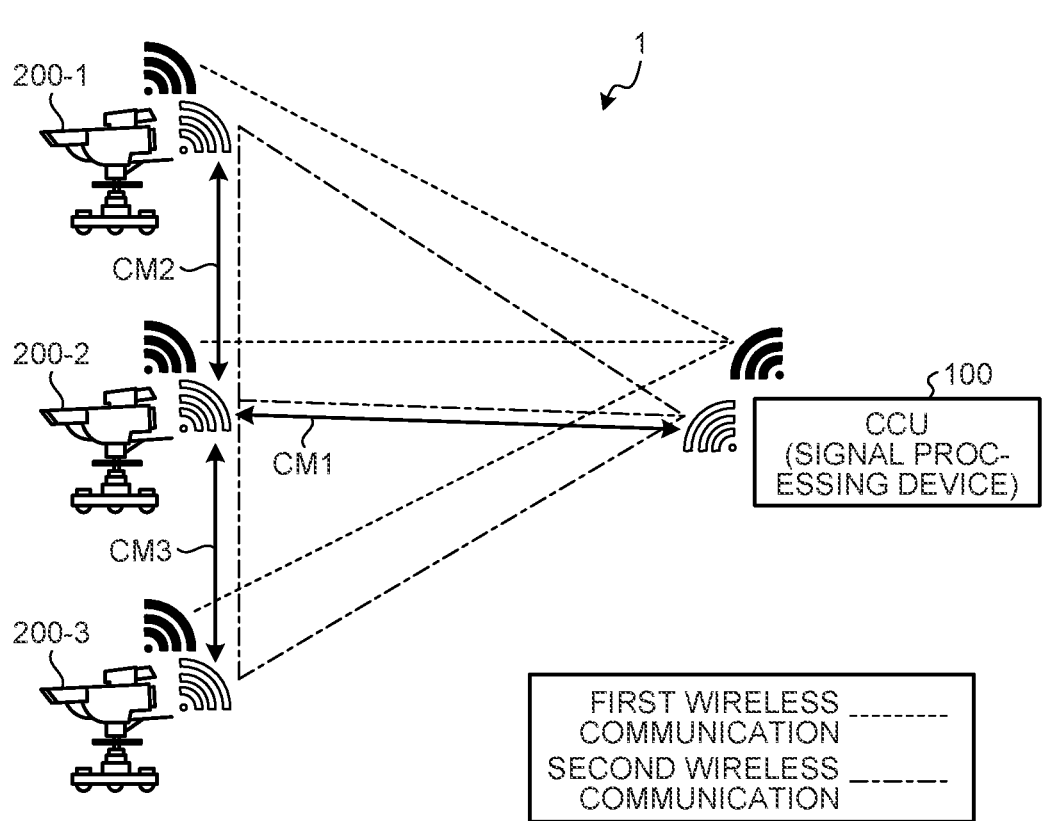
FIG. 8 is a diagram illustrating an example of communication processing using a master camera.

In a case where there is a plurality of cameras (CAMs 200) as in the example of FIG. 1, an operation mode in which a master camera is determined may be adopted. This point will be described with reference to FIG. 8. FIG. 8 is a diagram illustrating an example of communication processing using the master camera. Note that description of points similar to those in FIG. 1 will be omitted.

In a case of the operation mode in which the master camera is determined, the camera system 1 includes one master camera and cameras other than the master camera (hereinafter, also referred to as "slave cameras"). In this case, for example, the CCU 100 transmits a control signal common to the plurality of CAMs 200 to one master camera among the plurality of CAMs 200. One master camera among the plurality of CAMs 200 transmits a control signal to other CAMs 200 (a plurality of slave cameras).

The example of FIG. 8 illustrates a case where a CAM 200-2 is a master camera. In this case, for example, the CCU 100 transmits a control signal of a common setting or the like, common to the plurality of CAMs 200 to the CAM 200-2 which is the master camera. The CCU 100 transmits the control signal common to the plurality of CAMs 200 to the CAM 200-2 through communication CM1 in FIG. 8.

Then, the CAM 200-2 which is the master camera transmits the control signal received from the CCU 100 to a CAM 200-1 and a CAM 200-3 which are other CAMs 200 (a plurality of slave cameras). The CAM 200-2 transmits the control signal received from the CCU 100 to the CAM 200-1 through communication CM2 in FIG. 8. For example, the CAM 200-2 transmits the control signal for the CAM 200-1 received from the CCU 100 to the CAM 200-1. The CAM 200-2 transmits the control signal for the CAM 200-3 received from the CCU 100 to the CAM 200-3. In the example of FIG. 8, the camera system 1 can also transmit information to the CAM 200-1 and the CAM 200-3 via the CAM 200-2 which is the master camera.

As described above, in the operation mode in which the master camera is determined, the camera system 1 can perform the common setting via the master camera in a case where the common setting of each camera is performed from the CCU. As a result, the camera system 1 can improve utilization efficiency of the radio band. Note that the operation mode in which the master camera is determined is an example of the operation mode, and the camera system 1 may broadcast and set the common setting without determining the master camera, for example, in a case where there is no problem in the radio band.

2. SECOND EMBODIMENT

Note that the system configuration and the communication mode of the camera system are not limited to the above-described first embodiment, and various system configurations and communication modes may be employed. This point will be described below.

While in the first embodiment described above, a case where the CCU 100 and the CAM 200 directly communicate with each other has been described, a communication mode via another device (equipment) may be employed. In a second embodiment, a camera system 1A in which the CCU 100 and the CAM 200 communicate with each other via a base station will be described. Note that description of points similar to those of the first embodiment will be omitted as appropriate.

Figure 9:
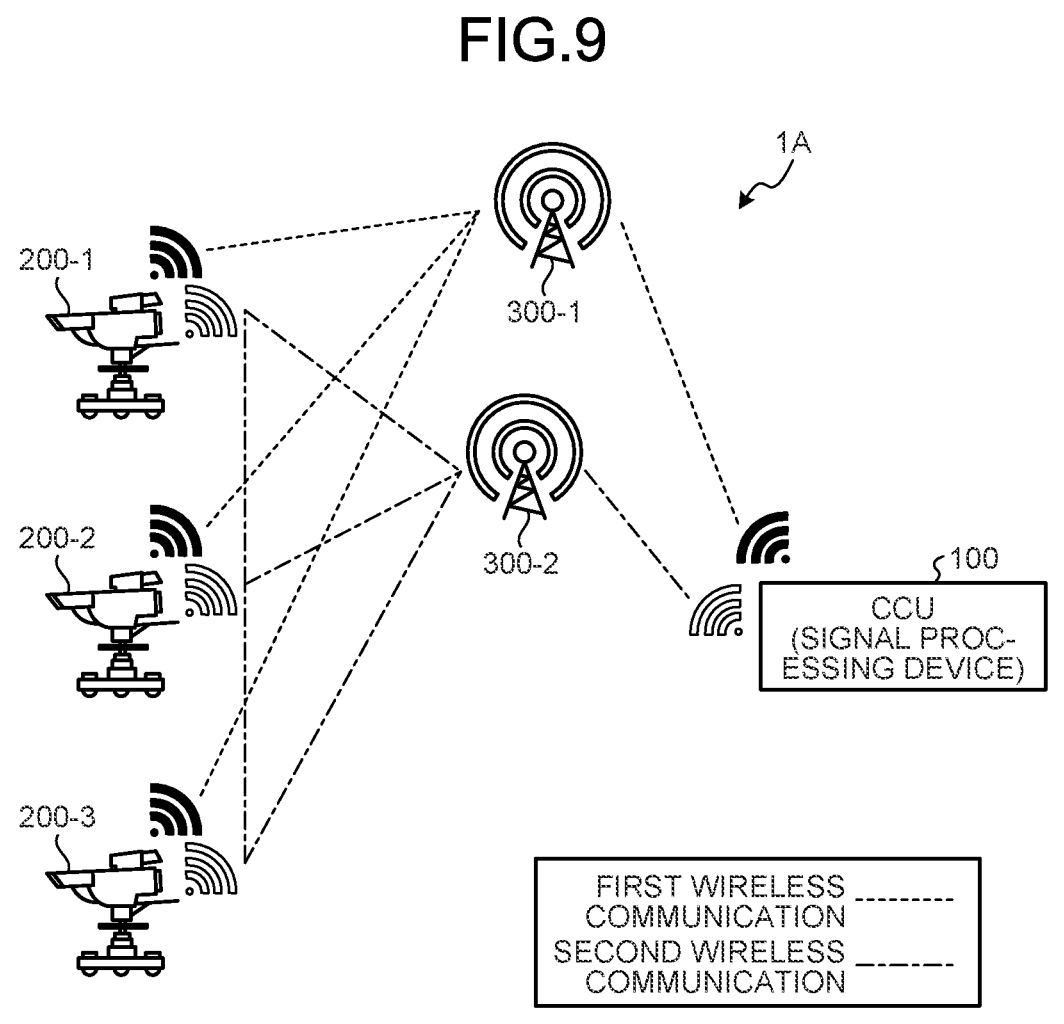

2-1. Outline of Camera System and Communication Processing According to Second Embodiment of Present Disclosure Outline of the camera system and communication processing according to the second embodiment will be described with reference to FIG. 9. FIG. 9 is a diagram illustrating an example of the camera system and the communication processing according to the second embodiment of the present disclosure. A configuration of the camera system 1A illustrated in FIG. 9 will be described. As illustrated in FIG. 9, the camera system 1A includes the CCU 100 and a plurality of CAMs 200. FIG. 9 illustrates a case where a wireless base station is interposed between the CAM 200 and the CCU 100.

In the camera system 1A, the first wireless communication is performed via a base station 300-1 which is a first base station. The base station 300-1 is a device that provides a wireless communication service to each device of the camera system 1A. The base station 300-1 is a wireless base station to be used for communication between devices of the camera system 1A. For example, the base station 300-1 is a base station that provides a wireless communication service through the first wireless communication. In the camera system 1A, the first wireless communication between the CAM 200 and the CCU 100 is performed via the base station 300-1 which is the first base station.

In the camera system 1A, the second wireless communication is performed via a base station 300-2 which is a second base station. The base station 300-2 is a device that provides a wireless communication service to each device of the camera system 1A. The base station 300-2 is a wireless base station to be used for communication between devices of the camera system 1A. For example, the base station 300-2 is a base station that provides a wireless communication service through the second wireless communication. In the camera system 1A, the second wireless communication between the CAM 200 and the CCU 100 is performed via the base station 300-2 which is the second base station.

Note that the base station 300-1 and the base station 300-2 will be referred to as the base station 300 when they are described without being particularly distinguished. Although only two of the base station 300-1 and the base station 300-2 are illustrated in FIG. 9, there may be three or more base stations 300. The camera system 1A may include the base station 300. In addition, the first base station that performs the first wireless communication and the second base station that performs the second wireless communication may be integrated. For example, the base station 300-1 and the base station 300-2 may be integrated.

2-2. 5G

Figure 10:
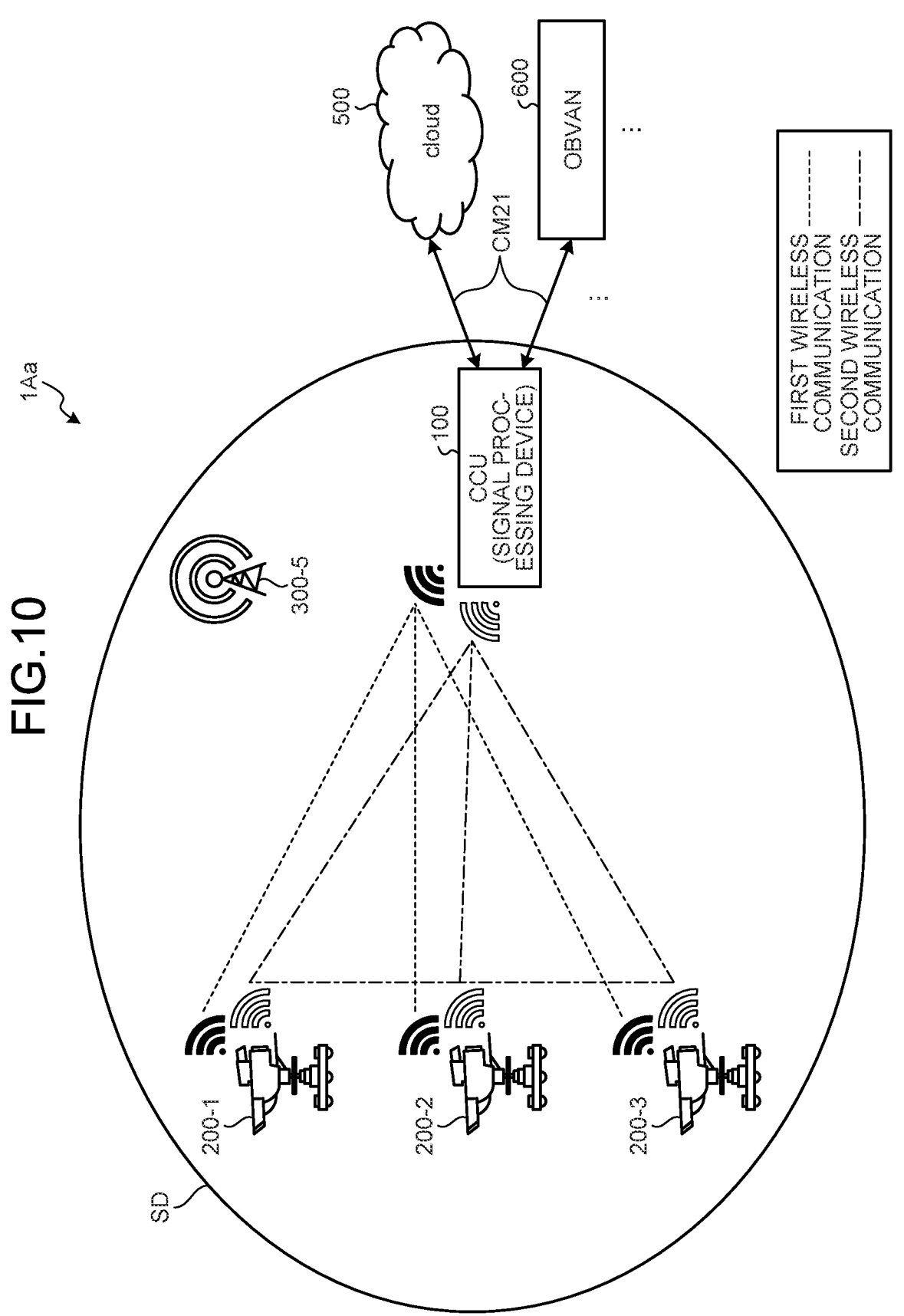
FIG. 10 is a diagram illustrating an example in which a 5G base station is disposed in a stadium.
Figure 11:
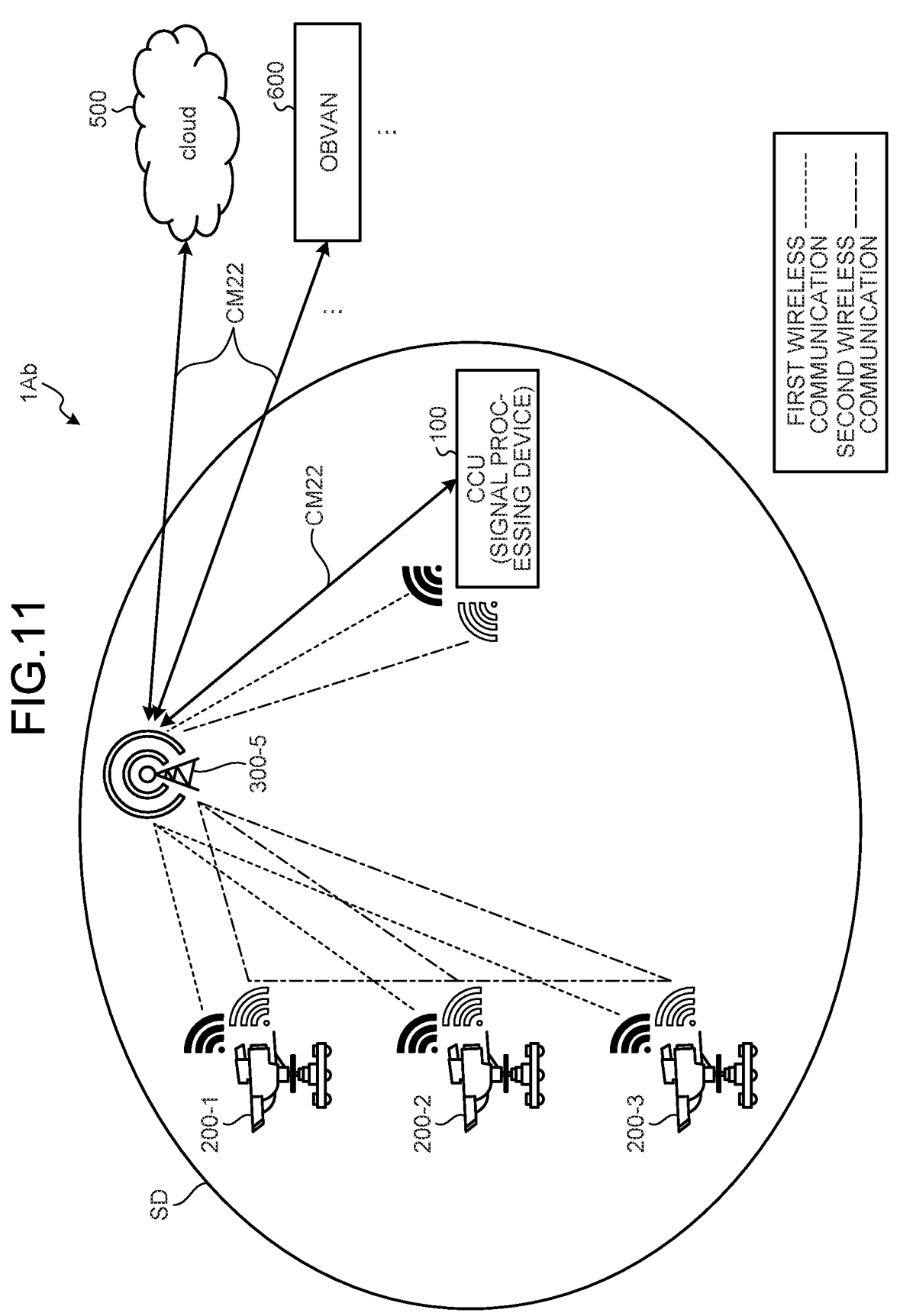
FIG. 11 is a diagram illustrating an example in which the 5G base station is disposed in a stadium.

As described above, the camera system may be constituted using 5G-related techniques. For example, the camera system may have a system configuration using a base station (also referred to as a "5G base station") that provides 5G communication. This point will be described with reference to FIG. 10 and FIG. 11. FIG. 10 and FIG. 11 are diagrams illustrating an example in which the 5G base station is disposed in a stadium. Note that description of points similar to those of the camera system 1 and the camera system 1A described above will be omitted as appropriate.

2-2-1. Example 1 of 5G

First, Example 1 of 5G will be described with reference to FIG. 10. As illustrated in FIG. 10, a camera system 1Aa includes the CCU 100, the CAM 200, a cloud 500, and an OBVAN 600. The cloud 500 is a server device (cloud server) or the like to be used to provide a cloud service and has a function of communicating with the CCU 100. The cloud 500 provides a service using information received from the CCU 100 and transmits information to other devices. Furthermore, the OBVAN 600 is an automobile, which is so-called an outside broadcast van, equipped with equipment for recording and transmitting a live video and has a function of communicating with the CCU 100.

In the example illustrated in FIG. 10, the CCU 100, the CAM 200, and a 5G base station 300-5 are disposed in a stadium SD which is a stadium. As described above, FIG. 10 illustrates a case where the 5G base station 300-5 is installed in the stadium SD. Note that, in FIG. 10, a case where the CCU 100, the CAM 200, and the 5G base station 300-5 are disposed in the stadium SD is illustrated as an example. However, a place where the CCU 100, the CAM 200, and the 5G base station 300-5 are disposed is not limited to the stadium SD and may be inside other structures such as a concert hall and a building.

Meanwhile, the cloud 500 and the OBVAN 600 are disposed outside the stadium SD. The cloud 500, the OBVAN 600, and the like, disposed outside the stadium SD may be referred to as "external devices". Note that the external devices disposed outside the stadium SD are not limited to the cloud 500 and the OBVAN 600 and may include any device as long as the device can communicate with the device in the stadium SD such as the CCU 100.

In the camera system 1Aa of FIG. 10, wireless communication is performed using device to device (D2D) communication in which resources are secured by the 5G base station 300-5 installed in the stadium SD. In the camera system 1Aa, communication using D2D communication is performed in the stadium SD. Communication using D2D communication is performed between the CAMs 200 disposed in the stadium SD. Furthermore, communication using D2D communication is performed between each CAM 200 and the CCU 100 disposed in the stadium SD. For example, direct communication is performed between each of the CAMs 200 and the CCU 100 and between the CAMs 200 without passing through the 5G base station 300-5.

For example, return (RET) video and audio signals are transmitted and received between each of the CAMs 200 and the CCU 100 and between the CAMs 200 by using D2D communication. For example, the second signal is transmitted and received between each of the CAMs 200 and the CCU 100 and between the CAMs 200 using D2D communication. For example, each CAM 200 transmits the first signal to the CCU 100 through D2D communication.

Furthermore, in the camera system 1Aa of FIG. 10, the devices in the stadium SD and the devices outside the stadium SD (external devices) communicate via a base station or a core network (core network). For example, the devices in the stadium SD and the devices (external devices) outside the stadium SD perform communication via a base station other than the 5G base station 300-5 or the 5G base station 300-5.

In the camera system 1Aa of FIG. 10, the CCU 100 transmits and receives various signals (information) to and from the external devices such as the cloud 500 and the OBVAN 600 through communication CM21 in FIG. 10. For example, live video and the like are communicated between the CCU 100 and the external devices such as the cloud 500 and the OBVAN 600 via a base station or a core network (core network).

2-2-2. Example 2 of 5G

Next, Example 2 of 5G will be described with reference to FIG. 11. Note that description of points similar to those in FIG. 10 will be omitted as appropriate. For example, FIG. 11 is different from FIG. 10 in that communication between the CAM 200 and the CCU 100 is performed via a base station or a core network (core network).

In a camera system 1Ab of FIG. 11, wireless communication inside and outside the stadium SD is performed via a 5G base station or a core network installed in the stadium SD. In the camera system 1Ab of FIG. 11, communication in the stadium SD is performed via the 5G base station 300-5. Communication is performed between the CAMs 200 disposed in the stadium SD via the 5G base station 300-5. Furthermore, communication is performed between each CAM 200 and the CCU 100 disposed in the stadium SD via the 5G base station 300-5.

For example, return (RET) video and audio signals are transmitted and received between each of the CAMs 200 and the CCU 100 and between the CAMs 200 via the 5G base station 300-5. For example, the second signal is transmitted and received between each of the CAMs 200 and the CCU 100 and between the CAMs 200 via the 5G base station 300-5. For example, each CAM 200 transmits the first signal to the CCU 100 via the 5G base station 300-5.

Furthermore, in the camera system 1Ab of FIG. 11, the devices in the stadium SD and the devices outside the stadium SD (external devices) communicate via a base station or a core network (core network). For example, the devices in the stadium SD and the devices (external devices) outside the stadium SD perform communication via a base station other than the 5G base station 300-5 or the 5G base station 300-5.

In the camera system 1Ab of FIG. 11, the CCU 100 transmits and receives various signals (information) to and from the external devices such as the cloud 500 and the OBVAN 600 through the communication CM21 in FIG. 11. For example, live video and the like are communicated between the CCU 100 and the external devices such as the cloud 500 and the OBVAN 600 via a base station or a core network (core network).

3. THIRD EMBODIMENT

While in the first embodiment and the second embodiment, the system configuration using one CCU 100 has been described, a plurality of CCUs 100 may be provided. In a third embodiment, a camera system 1B including a plurality of CCUs 100 will be described. Note that description of points similar to those of the first embodiment and the second embodiment will be omitted as appropriate.

Figure 12:
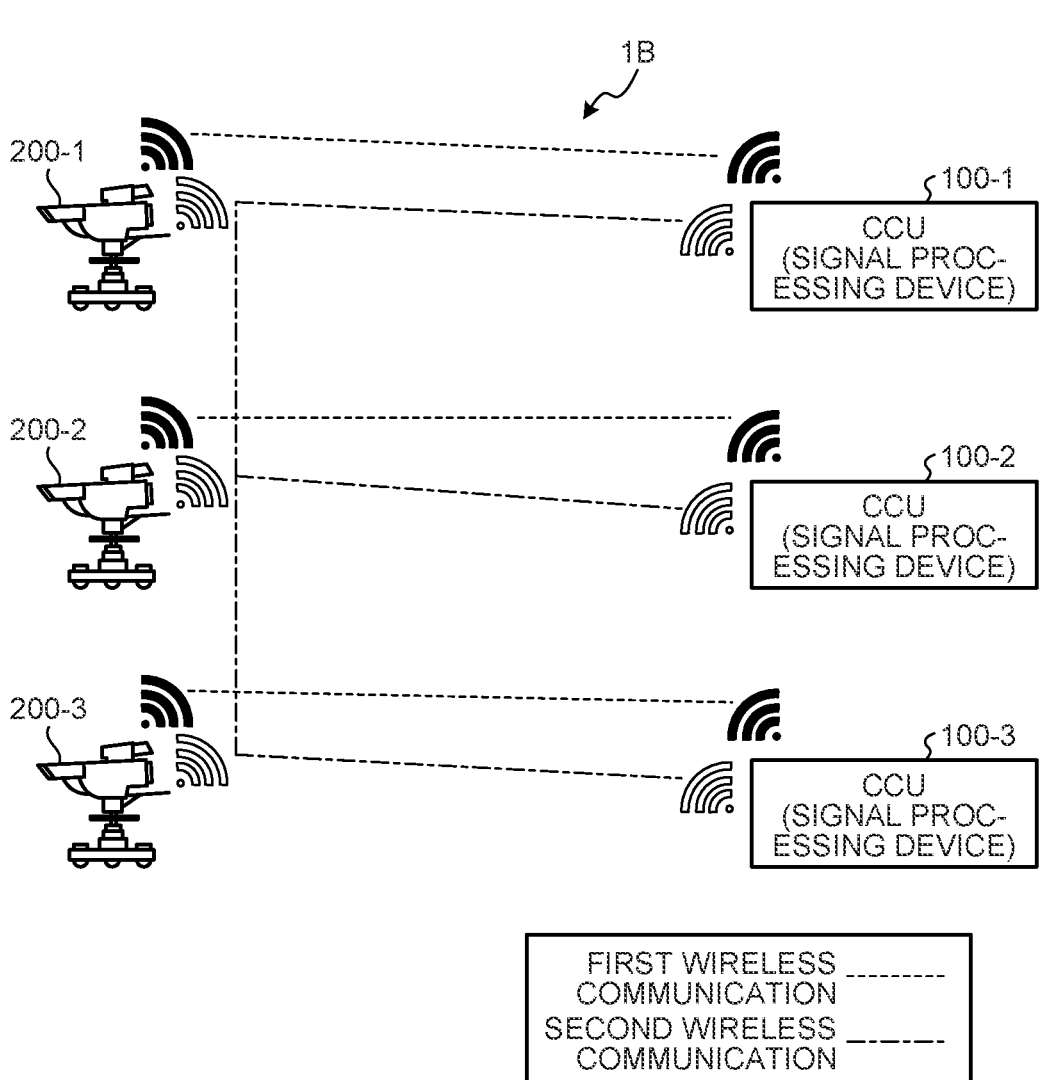
FIG. 12 is a diagram illustrating an example of a camera system and communication processing according to a third embodiment of the present disclosure.

3-1. Outline of Camera System and Communication Processing According to Third Embodiment of Present Disclosure Outline of the camera system and communication processing according to the third embodiment will be described with reference to FIG. 12. FIG. 12 is a diagram illustrating an example of the camera system and the communication processing according to the third embodiment of the present disclosure. As illustrated in FIG. 12, the camera system 1B includes a plurality of CCUs 100 and a plurality of CAMs 200. In a case where a CCU 100-1 to a CCU 100-3 and the like are described without being particularly distinguished, they are referred to as the CCU 100.

In the camera system 1B illustrated in FIG. 12, a configuration in which one CAM 200 is connected to one CCU 100, that is, a configuration in which the camera and the CCU are connected on a one-to-one basis is illustrated. The CCU 100 according to the third embodiment is different from the CCU 100 according to the first embodiment and the CCU 100 according to the second embodiment in communicating with one CAM 200.

In the example of FIG. 12, the CCU 100-1 is wirelessly connected to a CAM 200-1. The CAM 200-1 transmits a signal (first signal) of the main line video to the CCU 100-1 through the first wireless communication. The CCU 100-1 receives the first signal from the CAM 200-1 through the first wireless communication. The CAM 200-1 transmits a signal (second signal) other than the first signal to the CCU 100-1 through the second wireless communication. The CCU 100-1 receives the second signal from the CAM 200-1 through the second wireless communication.

In the example of FIG. 12, the CCU 100-2 is wirelessly connected to a CAM 200-2. The CAM 200-2 transmits a signal (first signal) of the main line video to the CCU 100-2 through the first wireless communication. The CCU 100-2 receives the first signal from the CAM 200-2 through the first wireless communication. The CAM 200-2 transmits a signal (second signal) other than the first signal to the CCU 100-2 through the second wireless communication. The CCU 100-2 receives the second signal from the CAM 200-2 through the second wireless communication.

In the example of FIG. 12, the CCU 100-3 is wirelessly connected to a CAM 200-3. The CAM 200-3 transmits a signal (first signal) of the main line video to the CCU 100-3 through the first wireless communication. The CCU 100-3 receives the first signal from the CAM 200-3 through the first wireless communication. The CAM 200-3 transmits a signal (second signal) other than the first signal to the CCU 100-3 through the second wireless communication. The CCU 100-3 receives the second signal from the CAM 200-3 through the second wireless communication.

4. FOURTH EMBODIMENT

The camera system may have a system configuration in which components are divided into a plurality of groups. In a fourth embodiment, a camera system 1C including a plurality of groups including the CCU 100 and the CAM 200 will be described. Note that description of points similar to those of the first to third embodiments will be omitted as appropriate.

4-1. Outline of Camera System and Communication Processing According to Fourth Embodiment of Present Disclosure The camera system 1C illustrated in FIG. 13 includes a group GP1 including one CCU 100-1 and two CAMs 200-1 and 200-2, and a group GP2 including one CCU 100-2 and two CAMs 200-3 and 200-4. In the camera system 1C, components are grouped for each CCU 100 in the same system.

Figure 13:
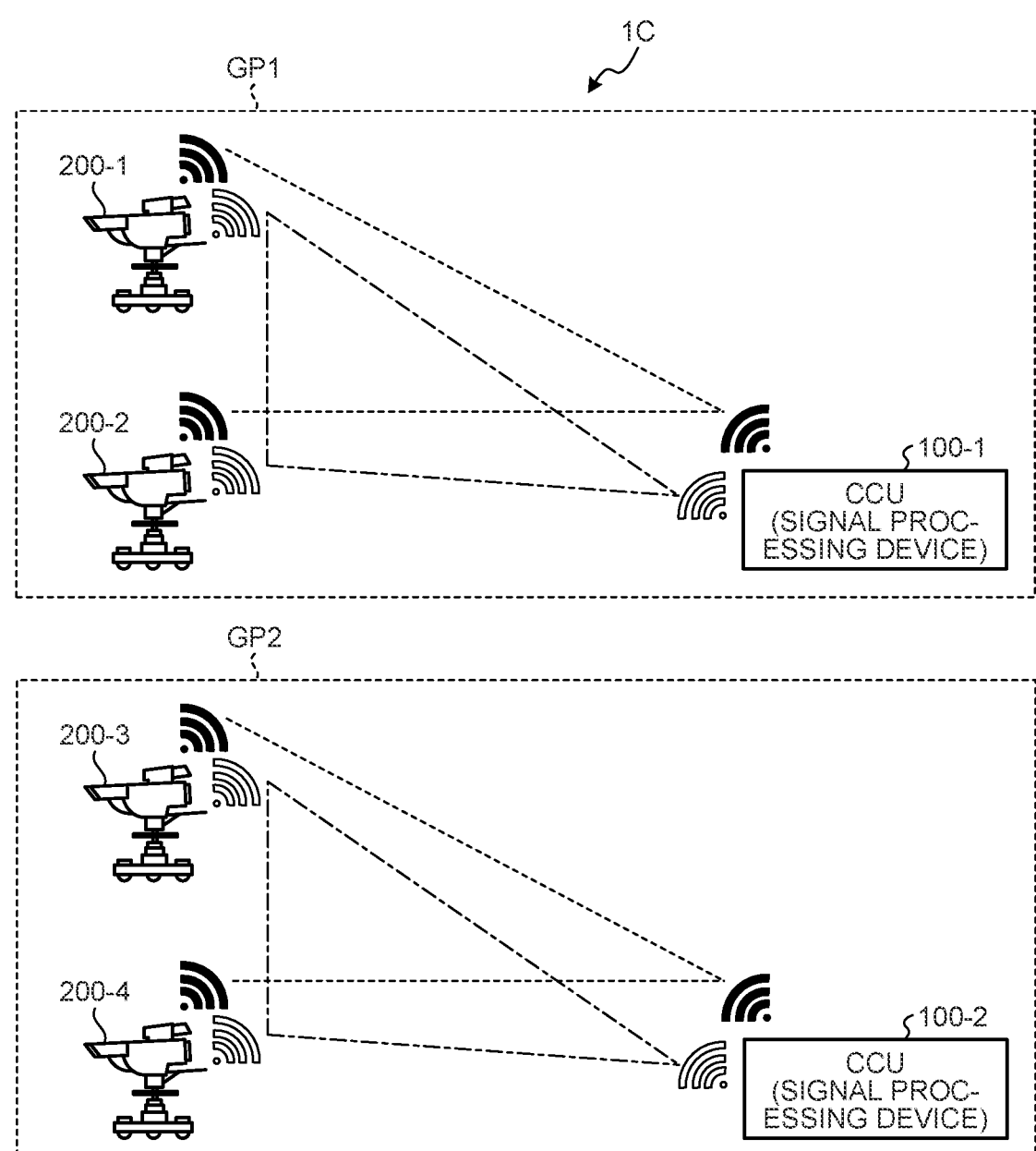
FIG. 13 is a diagram illustrating an example of a camera system and communication processing according to a fourth embodiment of the present disclosure.

In the example of FIG. 13, the CCU 100-1 is wirelessly connected to the CAM 200-1 and the CAM 200-2. The CAM 200-1 and the CAM 200-2 transmit a signal (first signal) of the main line video to the CCU 100-1 through the first wireless communication. The CCU 100-1 receives the first signal from the CAM 200-1 and the CAM 200-2 through the first wireless communication. The CCU 100-1 receives the second signal from the CAM 200-1 and the CAM 200-2 through the second wireless communication. The CAM 200-1 and the CAM 200-2 transmit and receive the second signal through the second wireless communication. The CAM 200-1 transmits a signal (second signal) other than the first signal to the CCU 100-1 and the CAM 200-2 through the second wireless communication. The CAM 200-2 transmits a signal (second signal) other than the first signal to the CCU 100-1 and the CAM 200-1 through the second wireless communication.

In the example of FIG. 13, the CCU 100-2 is wirelessly connected to the CAM 200-3 and the CAM 200-4. The CAM 200-3 and the CAM 200-4 transmit the signal (first signal) of the main line video to the CCU 100-2 through the first wireless communication. The CCU 100-2 receives the first signal from the CAM 200-3 and the CAM 200-4 through the first wireless communication. The CCU 100-2 receives the second signal from the CAM 200-3 and the CAM 200-4 through the second wireless communication. The CAM 200-3 and the CAM 200-4 transmit and receive the second signal through the second wireless communication. The CAM 200-3 transmits a signal (second signal) other than the first signal to the CCU 100-2 and the CAM 200-4 through the second wireless communication. The CAM 200-4 transmits a signal (second signal) other than the first signal to the CCU 100-2 and the CAM 200-3 through the second wireless communication.

The CCU 100 stores information (for example, a camera ID or the like) for identifying a camera belonging to the same group as the group of the CCU 100 in a storage unit. The CCU 100 stores information (camera ID) for identifying a camera connectable to the CCU 100 in the storage unit. The CCU 100 determines whether or not to allow connection of the CAM 200 that requests connection on the basis of a comparison result between the camera ID stored in the storage unit and the camera ID of the CAM 200 that requests connection. Thus, in a case where the camera (CAM 200-3) of the group GP2 makes a connection to the CCU 100-1 of the group GP2, the CCU 100-1 rejects the connection. For example, in a case where the camera (CAM 200-3) of the group GP2 makes a connection to the CCU 100-1 of the group GP2, the CCU 100-1 rejects the connection of the CAM 200-3 because the camera ID of the CAM 200-3 is not included in the camera ID for which connection to the CCU 100-1 is allowed.

As described above, the camera system 1C can reject connection on the CCU 100 side even in a case where the CAMs 200 of different groups request connection to the CCU 100. For example, in the system camera, different camera numbers (camera IDs or the like) are always allocated for each camera, so that it is possible to appropriately determine whether or not to allow connection by managing the camera numbers on the CCU side. For example, in a case where the CAM 200 having a camera number different from the camera numbers managed by the CCU 100 requests connection, the CCU 100 rejects the connection.

In each Example, a mesh network is employed for control signals such as a synchronization signal, a command, TALLY, and INCOM, and RET images. As a result, even in a case where connection between one camera (CAM 200)

and the signal processing device (CCU 100 or the like) is disconnected, signals can be communicated via another camera (CAM 200). As described above, the camera (CAM 200) to which connection is disconnected and the signal processing device (CCU 100 or the like) can communicate signals via another camera (CAM 200), which improves reliability. In this case, a case of passing through two or more cameras is also conceivable, in which case there is a possibility that a delay due to this becomes a problem. However, by restricting the via-route by setting the number of hops of an Internet Protocol (IP) technology, or the like, it is possible to reduce the possibility that the delay becomes a problem. For example, by setting the number of hops such that the delay is within an allowable range, for example, the delay is equal to or less than a predetermined threshold, it is possible to reduce the possibility that the delay becomes a problem. Furthermore, the cameras (CAMs 200) are wirelessly connected to each other, so that it is not necessary to pass through the signal processing device (CCU 100 or the like) when INCOM and RET images are exchanged between camera operators. It is therefore possible to effectively use a radio band between the camera and the signal processing device (the CCU 100 or the like).

5. FIFTH EMBODIMENT

The camera system may include other devices in addition to the CCU 100 and the CAM 200. In a fifth embodiment, a camera system 2 including a signal processing device 400 (hereinafter, also referred to as a "BPU 400") in addition to the CCU 100 and the CAM 200 will be described. For example, in the camera system 2, operation is performed in a state where the BPU 400 is inserted between the CCU 100 and the CAM 200. Note that description of points similar to those of the first to fourth embodiments will be omitted as appropriate.

Figure 14:
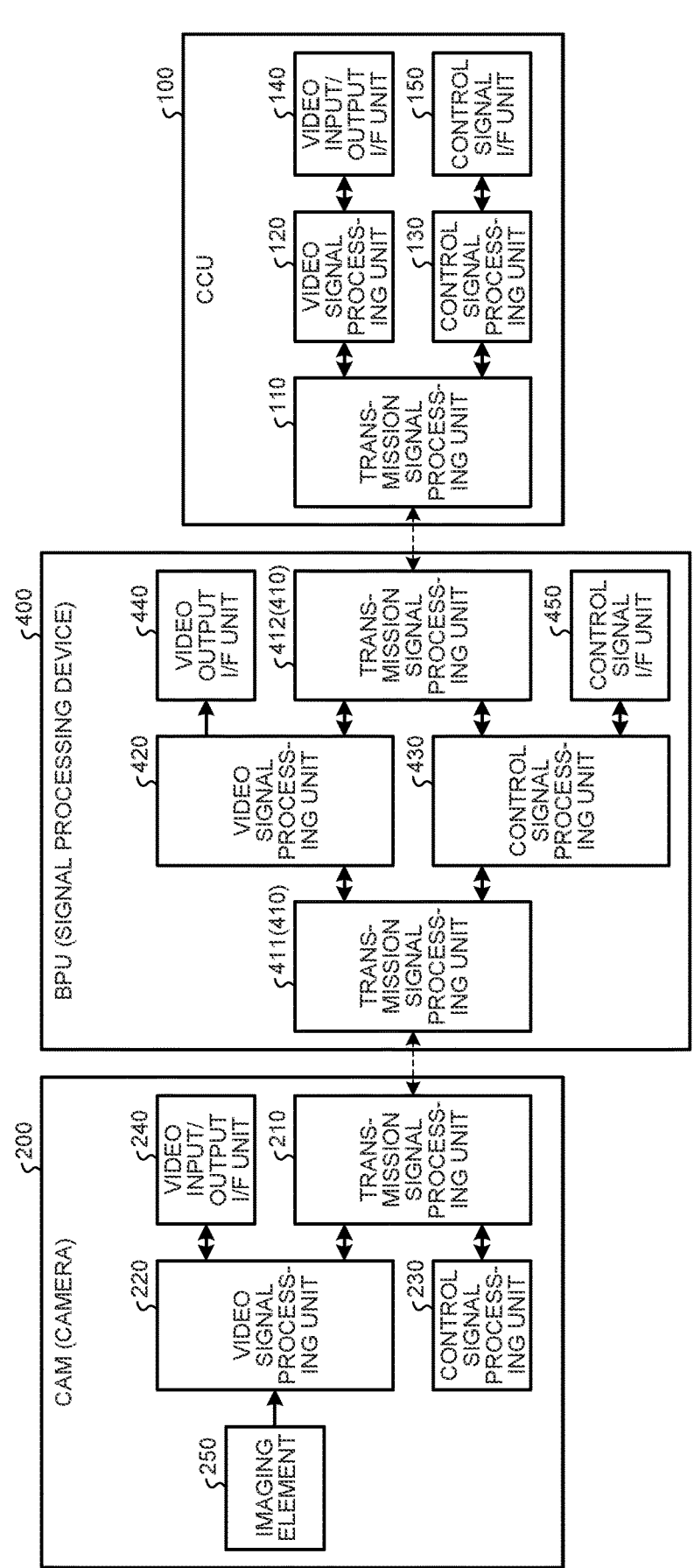
FIG. 14 is a diagram illustrating a configuration example of a camera system according to a fifth embodiment of the present disclosure.

5-1. Configuration of Camera System According to Fifth Embodiment of Present Disclosure First, a configuration of the camera system 2 including the BPU 400 will be described with reference to FIG. 14. FIG. 14 is a diagram illustrating a configuration example of the camera system according to the fifth embodiment of the present disclosure.

Figure 15:
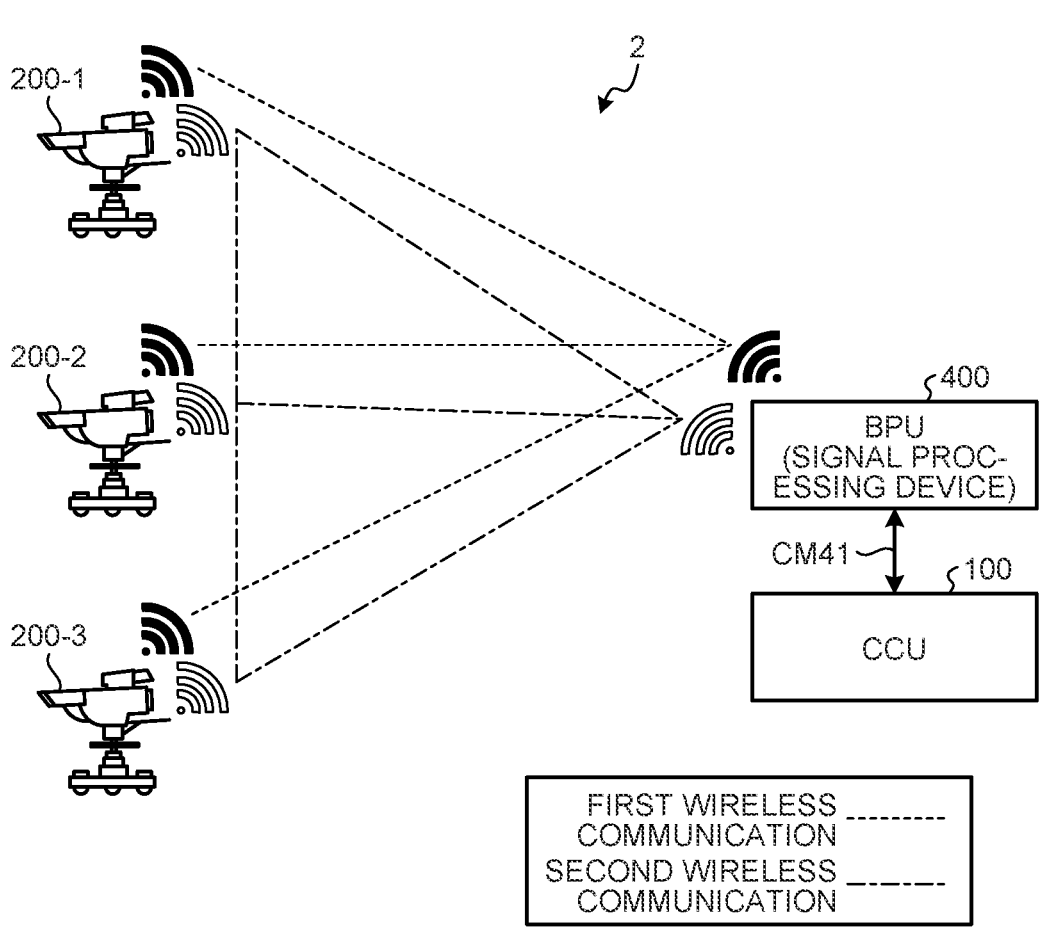
FIG. 15 is a diagram illustrating an example of communication processing according to the fifth embodiment of the present disclosure.

As illustrated in FIG. 14, the camera system 2 includes the CCU 100, the CAM 200, and the BPU 400. The BPU 400 and the CCU 100 are wirelessly communicably connected via a predetermined communication network (network). In addition, the BPU 400 and the CAM 200 are wirelessly communicably connected via a predetermined communication network (network). As described above, the camera system 2 is different from the camera systems in the first to fourth embodiments in that the BPU 400 communicates with the CCU 100 and the CAM 200. Note that the camera system 2 illustrated in FIG. 14 may include a plurality of CAMs 200, a plurality of CCUs 100, and a plurality of BPUs 400. For example, the example of FIG. 15 illustrates a case where the camera system 2 illustrated in FIG. 14 includes three CAMs 200.

The CCU 100 according to the fifth embodiment is different from the CCUs in the first to fourth embodiments in communicating with the BPU 400.

The transmission signal processing unit 110 according to the fifth embodiment functions as a communication unit that communicates with the BPU 400. The transmission signal processing unit 110 is connected to a predetermined network in a wired or wireless manner and transmits and receives information to and from the BPU 400 via the predetermined network. The CCU 100 according to the fifth embodiment may be connected to the BPU 400 in a wired manner.

The CAM 200 according to the fifth embodiment is different from the CAMs in the first to fourth embodiments in communicating with the BPU 400.

The transmission signal processing unit 210 according to the fifth embodiment functions as a wireless communication unit that performs wireless communication with the BPU 400 which is a signal processing device that performs signal processing related to a video.

The transmission signal processing unit 210 is implemented by, for example, an NIC, a communication circuit, or the like. The transmission signal processing unit 210 transmits and receives a signal (information) to and from the BPU 400 through wireless communication. The transmission signal processing unit 210 controls communication with other devices such as the BPU 400. The transmission signal processing unit 210 controls communication with the BPU 400. The transmission signal processing unit 210 transmits the video (signal) captured by the imaging element 250 to the BPU 400. The transmission signal processing unit 210 receives a control signal from the BPU 400. For example, the transmission signal processing unit 210 receives a control signal for controlling a diaphragm of the camera, a white level and a black level of a video signal, color tone, and the like, from the BPU 400.

The BPU 400 is also referred to as a baseband processor unit and is an information processing device to be used to perform control related to the camera. The BPU 400 is connected to the camera and the CCU and performs color adjustment and the like. The BPU 400 is a signal processing device that has a wireless communication function and performs signal processing related to the video captured by the camera. For example, the BPU 400 wirelessly communicates with the camera. For example, the BPU 400 transmits a control signal for controlling a diaphragm of the camera, a white level and a black level of the video signal, color tone, and the like, to the camera. For example, the BPU 400 performs gamma correction and demosaic processing.

The BPU 400 has a wireless communication function and performs signal processing related to the video captured by the CAM 200. The BPU 400 is wirelessly connected to the CAM 200. The BPU 400 communicates, with the CAM 200, a first signal that is a signal of the video captured by the CAM 200 through the first wireless communication. The BPU 400 receives the signal of the video captured by the CAM 200 from the CAM 200 through the first wireless communication.

The BPU 400 communicates a second signal other than the first signal with the CAM 200 through the second wireless communication different from the first wireless communication. The BPU 400 transmits and receives the second signal other than the first signal to and from the CAM 200 through the second wireless communication.

The BPU 400 communicates with the CAM 200 through the first communication that satisfies at least one of a wider bandwidth than the bandwidth of the second wireless communication, higher reliability than reliability of the second wireless communication, or a lower delay than a delay of the second wireless communication. The BPU 400 communicates the second signal with the CAM 200 through the second wireless communication which is 4G communication and communicates the first signal with the CAM 200 through the first wireless communication which is 5G communication.

The BPU 400 communicates signals related to imaging by the CAM 200 with the CAM 200. The BPU 400 communicates a signal to be used to control the CAM 200 with the CAM 200. The BPU 400 communicates a synchronization signal with another CAM 200 or a command signal for controlling the CAM 200 with the CAM 200.

The BPU 400 communicates a signal to be used for information transmission between users who use the camera system 1 with the CAM 200. The BPU 400 communicates, with the CAM 200, a signal of a video having resolution lower than that of the video (main line video) captured by the CAM 200 or a signal of a speech of the user. The BPU 400 communicates the RET image signal or the INCOM signal with the CAM 200.

The BPU 400 communicates a signal to be used for information transmission to the imaging subject by the CAM 200 with the CAM 200. The BPU 400 communicates, with the CAM 200, a signal for indicating the status of the CAM 200 to the imaging subject or a signal of character information to be notified to the imaging subject. The BPU 400 communicates a TALLY signal or a prompter signal with the CAM 200.

The BPU 400 communicates with the plurality of CAMs 200 through the first wireless communication and the second wireless communication. The BPU 400 identifies a manufacturer of the CAM 200 at the time of wireless connection with the CAM 200. The BPU 400 receives information for identifying the manufacturer of the CAM 200 from the CAM 200. For example, the BPU 400 requests information for identifying the manufacturer of the CAM 200 from the CAM 200.

The BPU 400 transmits the main line video received from the CAM 200 to the CCU 100. The BPU 400 transmits the first signal received from the CAM 200 to the CCU 100. The BPU 400 performs signal processing on the first signal received from the CAM 200 and transmits the first signal subjected to the signal processing to the CCU 100.

The BPU 400 transmits a control signal to the CAM 200. The BPU 400 transmits the second signal to the CAM 200. The BPU 400 transmits the control signal received from the CCU 100 to the CAM 200. The BPU 400 transmits the second signal received from the CCU 100 to the CAM 200.

5-1-1. Configuration of Signal Processing Device According to Fifth Embodiment Next, a configuration of the BPU 400 according to the fifth embodiment will be described. Note that FIG. 14 illustrates only components related to communication processing among the components of the BPU 400.

Figure 16:
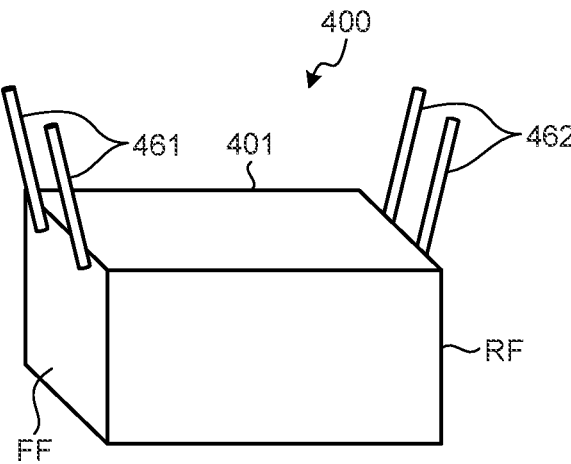
FIG. 16 is a diagram illustrating an example of antenna arrangement of the signal processing device.

As illustrated in FIG. 14, the BPU 400 includes a transmission signal processing unit 410, a video signal processing unit 420, a control signal processing unit 430, a video input/output I/F unit 440, a control signal I/F unit 450, and antenna units 461 and 462 (see FIG. 16).

The transmission signal processing unit 410 functions as a communication unit that transmits and receives a signal. The transmission signal processing unit 410 includes a transmission signal processing unit 411 that is a second communication unit communicating with the CAM 200 and a transmission signal processing unit 412 that is a first communication unit communicating with the CCU 100. Note that the transmission signal processing unit 411 and the transmission signal processing unit 412 may be integrated. In a case where the transmission signal processing unit 411 and the transmission signal processing unit 412 are described without distinction, they will be referred to as the transmission signal processing unit 410.

The transmission signal processing unit 411 functions as a wireless communication unit that performs wireless communication with a camera that captures a video. The transmission signal processing unit 411 is implemented by, for example, an NIC, a communication circuit, or the like. The transmission signal processing unit 411 transmits and receives a signal (information) to and from the CAM 200 through wireless communication. The transmission signal processing unit 411 receives a signal from the CAM 200. The transmission signal processing unit 411 receives a video (signal) from the CAM 200.

The transmission signal processing unit 411 controls communication. The transmission signal processing unit 411 controls communication with other devices such as the CAM 200. The transmission signal processing unit 411 controls communication between external information processing devices. The transmission signal processing unit 411 controls communication with the CAM 200. The transmission signal processing unit 411 transmits the signal (information) received from the CCU 100 by the transmission signal processing unit 412 to the CAM 200.

The transmission signal processing unit 412 functions as a wireless communication unit that performs wireless communication with the CCU 100. The transmission signal processing unit 412 is implemented by, for example, an NIC, a communication circuit, or the like. The transmission signal processing unit 412 transmits and receives a signal (information) to and from the CCU 100 through wireless communication or wired communication. The transmission signal processing unit 412 receives a signal from the CCU 100. The transmission signal processing unit 412 receives a video (signal) from the CCU 100.

The transmission signal processing unit 412 controls communication. The transmission signal processing unit 412 controls communication with other devices such as the CCU 100. The transmission signal processing unit 412 controls communication between external information processing devices. The transmission signal processing unit 412 controls communication with the CCU 100. The transmission signal processing unit 412 transmits the signal (information) received from the CAM 200 by the transmission signal processing unit 411 to the CCU 100.

Furthermore, the transmission signal processing unit 410 may be connected to a predetermined network in a wired or wireless manner and transmit and receive information to and from other devices or the like via the predetermined network. In a case where communication is performed with other cameras that perform wired communication, the BPU 400 may have a connector portion to be used for wired connection with the cameras. The BPU 400 is connected to the cameras in a wired manner by connecting camera cables or the like connected to the cameras to a connector portion. In this case, the transmission signal processing unit 410 controls communication with the cameras connected by the camera cables or the like via the connector portion. Note that the camera cables here may be various cables such as optical composite cables, optical fiber cables, and twisted pair cables.

The BPU 400 includes a storage unit. The storage unit is implemented by, for example, a semiconductor memory element such as a RAM and a flash memory, or a storage device such as a hard disk and an optical disk. The storage unit stores various kinds of information. The storage unit stores various kinds of information to be used for signal processing.

The video signal processing unit 420 is implemented by, for example, a CPU, an MPU, or the like, executing a program (for example, a signal processing program related to a video) stored in the BPU 400 using a RAM or the like as a work area. Furthermore, the video signal processing unit 420 may be implemented by, for example, an integrated circuit such as an ASIC and an FPGA.

The video signal processing unit 420 performs various kinds of signal processing. The video signal processing unit 420 performs signal processing related to a video. The video signal processing unit 420 functions as a signal processing unit that performs signal processing related to the video captured by the camera. The video signal processing unit 420 executes signal processing related to the video according to the control signal.

The video signal processing unit 420 performs video signal processing (image processing) on the signal received by the transmission signal processing unit 410. The video signal processing unit 420 executes various kinds of video signal processing. The video signal processing unit 420 performs processing related to color adjustment. For example, the video signal processing unit 420 performs processing related to demosaic. For example, the video signal processing unit 420 performs processing related to noise removal. For example, the video signal processing unit 420 performs processing related to gamma correction.

Note that the above is an example, and the video signal processing unit 420 executes various kinds of video signal processing as well as the above-described processing. For example, the video signal processing unit 420 may perform part of the video signal processing to be performed by the CCU 100 (video signal processing unit 120) and the CAM 200 (video signal processing unit 220).

The control signal processing unit 430 is implemented by, for example, a CPU, an MPU, or the like, executing a program (for example, a signal processing program related to control) stored in the BPU 400 using a RAM or the like as a work area. Furthermore, the control signal processing unit 430 may be implemented by, for example, an integrated circuit such as an ASIC and an FPGA.

The control signal processing unit 430 performs signal processing related to control. The control signal processing unit 430 performs signal processing related to control of the CAM 200. The control signal processing unit 430 performs signal processing related to control of the BPU 400. Furthermore, the control signal processing unit 430 performs signal processing related to control of the camera. The control signal processing unit 430 generates a control signal (control information) for controlling the camera. The control signal processing unit 430 performs signal processing related to control of the CAM 200. The control signal processing unit 430 generates a control signal for controlling the CAM 200.

The control signal processing unit 430 generates a signal of a command for controlling the camera. The control signal processing unit 430 generates a control signal for adjusting the diaphragm of the camera.

The control signal processing unit 430 controls the CAM 200 by transmitting the control signal to the CAM 200 via the transmission signal processing unit 410. The control signal processing unit 430 controls the camera by transmitting the control signal to the camera via the transmission signal processing unit 410. The control signal processing unit 430 outputs the control signal to the CAM 200 via the transmission signal processing unit 410. The control signal processing unit 430 outputs the control signal received from the CCU 100 to the CAM 200.

Note that the above is an example, and the control signal processing unit 430 executes various kinds of control signal processing as well as the above-described processing. For example, the control signal processing unit 430 may perform part of the control signal processing to be performed by the CCU 100 (video signal processing unit 120) and the CAM 200 (control signal processing unit 230).

The control signal processing unit 430 may be integrated with the video signal processing unit 420. For example, the video signal processing unit 420 and the control signal processing unit 430 may be implemented by the same processor.

The video input/output I/F unit 440 has a function as an input/output interface related to a video. The video input/output I/F unit 440 is an interface for connecting the BPU 400 and other information processing devices. For example, the video input/output I/F unit 440 has a function similar to that of the video input/output I/F unit 140.

The control signal I/F unit 450 has a function as an interface of a control signal. The control signal I/F unit 450 is an interface for connecting the BPU 400 and other information processing devices. The control signal I/F unit 450 has a function similar to that of the control signal I/F unit 150.

The antenna units 461 and 462 have a function of transmitting and receiving radio waves. The antenna units 461 and 462 radiate signals output from the transmission signal processing unit 410 into space as radio waves. Furthermore, the antenna units 461 and 462 convert radio waves in space into signals and output the signals to the transmission signal processing unit 410. Note that arrangement of the antenna units 461 and 462 will be described later.

5-2. Outline of Communication Processing According to Fifth Embodiment

FIG. 15 is a diagram illustrating an example of communication processing according to the fifth embodiment of the present disclosure. Furthermore, FIG. 15 is a diagram illustrating a configuration example of the camera system 2 according to the fifth embodiment of the present disclosure. The communication processing according to the fifth embodiment of the present disclosure is implemented by the camera system 2 illustrated in FIG. 15.

First, a configuration of the camera system 2 illustrated in FIG. 15 will be described. The camera system 2 is a system including the CCU 100, the CAM 200, and the BPU 400. As illustrated in FIG. 15, the camera system 2 includes the CCU 100, a plurality of CAMs 200, and the BPU 400. In the example of FIG. 15, only three CAMs 200-1, 200-2, and 200-3 are illustrated, but the camera system 2 may include four or more CAMs 200. As described above, the number of cameras (CAMs 200) included in the camera system 2 is not limited to three illustrated in FIG. 15 and may be determined by, for example, the connectable number according to a radio band, or the like.

Each CAM 200 captures a video. Each CAM 200 transmits the captured video (main line video) to the BPU 400. Each CAM 200 transmits a first signal (main line signal) to the BPU 400 through the first wireless communication indicated by a dotted line in FIG. 15. In addition, each of the CAMs 200 and the BPU 400 communicate a signal (second signal) other than the first signal through the second wireless communication. As described above, each CAM 200 and the BPU 400 transmit and receive the signal (second signal) other than the signal of the main line video through the second wireless communication. Each CAM 200 and the BPU 400 transmit and receive the second signal through the second wireless communication indicated by a dashed-dotted line in FIG. 15.

In addition, the CAMs 200 also communicate the second signal through the second wireless communication. As described above, the camera system 2 is a mesh network in which the CAMs 200 are also wirelessly connected to each other. In the example illustrated in FIG. 15, each of the CAMs 200 transmits and receives the second signal to and from other CAMs 200 through the second wireless communication indicated by a dashed-dotted line.

The first wireless communication for communicating the main line video is wireless communication having a wide bandwidth, high reliability, and a low delay. For example, the first wireless communication is communication that satisfies at least one of a wider bandwidth than a bandwidth of the second wireless communication, higher reliability than reliability of the second wireless communication, or a lower delay than a delay of the second wireless communication.

As described above, in the camera system 2, communication between the BPU 400 and the CAM 200 is wireless communication, and communication is performed using the first wireless communication for communicating the main line video and using the second wireless communication for communicating other information. As a result, the camera system 2 can improve a degree of freedom in installation of the camera.

Furthermore, the BPU 400 communicates with the CCU 100. The BPU 400 communicates various signals (information) such as the first signal and the second signal with the CCU 100. The BPU 400 transmits and receives various signals (information) such as the first signal and the second signal to and from the CCU 100 through communication CM41 in FIG. 15. For example, the BPU 400 transmits and receives various signals (information) such as the first signal and the second signal to and from the CCU 100 through the communication CM41 which is wireless communication. Furthermore, for example, the BPU 400 transmits and receives various signals (information) such as the first signal and the second signal to and from the CCU 100 through the communication CM41 which is wired communication.

5-3. Antenna Arrangement Example of Signal Processing Device

The antenna of the BPU 400 which is a signal processing device may be disposed in various manners. The arrangement of the antenna of the BPU 400 may be similar to the arrangement of the antenna of the CCU 100 illustrated in FIGS. 4 to 6.

In addition, in a case where the BPU 400 is wirelessly connected to the CCU 100, an antenna arrangement configuration as illustrated in FIG. 16 may be adopted. FIG. 16 is a diagram illustrating an example of antenna arrangement of the signal processing device. Note that the BPU 400 may be in a use form of being disposed at a predetermined position or may be in a portable (portable) use form.

In the example of FIG. 16, the antenna unit 461 of the BPU 400 is disposed on the front side of the BPU 400. The antenna unit 461 of the BPU 400 is disposed on the front surface FF side of a main body portion 401 of the BPU 400. The antenna unit 461 may be an antenna to be used for connection with the CAM 200. The antenna unit 461 is used for communication with the CAM 200 by the transmission signal processing unit 411. The main body portion 401 of the CCU 100 is a chassis (case) that stores components (a processor, a memory, and the like) that implement the transmission signal processing unit 411, the transmission signal processing unit 412, the video signal processing unit 420, the control signal processing unit 430, the video input/output I/F unit 440, the control signal I/F unit 450, the storage unit, and the like.

Furthermore, in a case where the BPU 400 is stored in a shelf or the like, the antenna unit 461 of the BPU 400 is disposed on the front surface FF side disposed on the front surface side of the shelf or the like. For example, in a case where the BPU 400 is stored in a shelf or the like, the antenna unit 461 of the BPU 400 is disposed on the front surface FF side disposed to face the front of the shelf.

The antenna unit 462 of the BPU 400 is disposed on the rear side of the BPU 400. The antenna unit 462 of the BPU 400 is disposed on the rear surface RF side of the main body portion 401 of the BPU 400. The antenna unit 462 may be an antenna to be used for connection with the CCU 100. The antenna unit 462 is used for communication with the CCU 100 by the transmission signal processing unit 412.

Furthermore, in a case where the BPU 400 is stored in a shelf or the like, the antenna unit 462 of the BPU 400 is disposed on the rear surface RF side disposed on the rear surface side of the shelf or the like. For example, in a case where the BPU 400 is stored in a shelf or the like, the antenna unit 462 of the BPU 400 is disposed on the rear surface RF side disposed to face the rear side of the shelf.

6. SIXTH EMBODIMENT

Note that a system configuration and a communication mode of the camera system including the BPU are not limited to the above-described fifth embodiment, and various system configurations and communication modes may be adopted. This point will be described below.

While in the fifth embodiment, a case where the BPU 400 and the CAM 200 directly communicate with each other has been described, a communication mode via another device (equipment) may be adopted. In a sixth embodiment, a camera system 2A in which the BPU 400 and the CAM 200 communicate with each other via a base station will be described. Note that description of points similar to those of the fifth embodiment will be omitted as appropriate.

Figure 17:
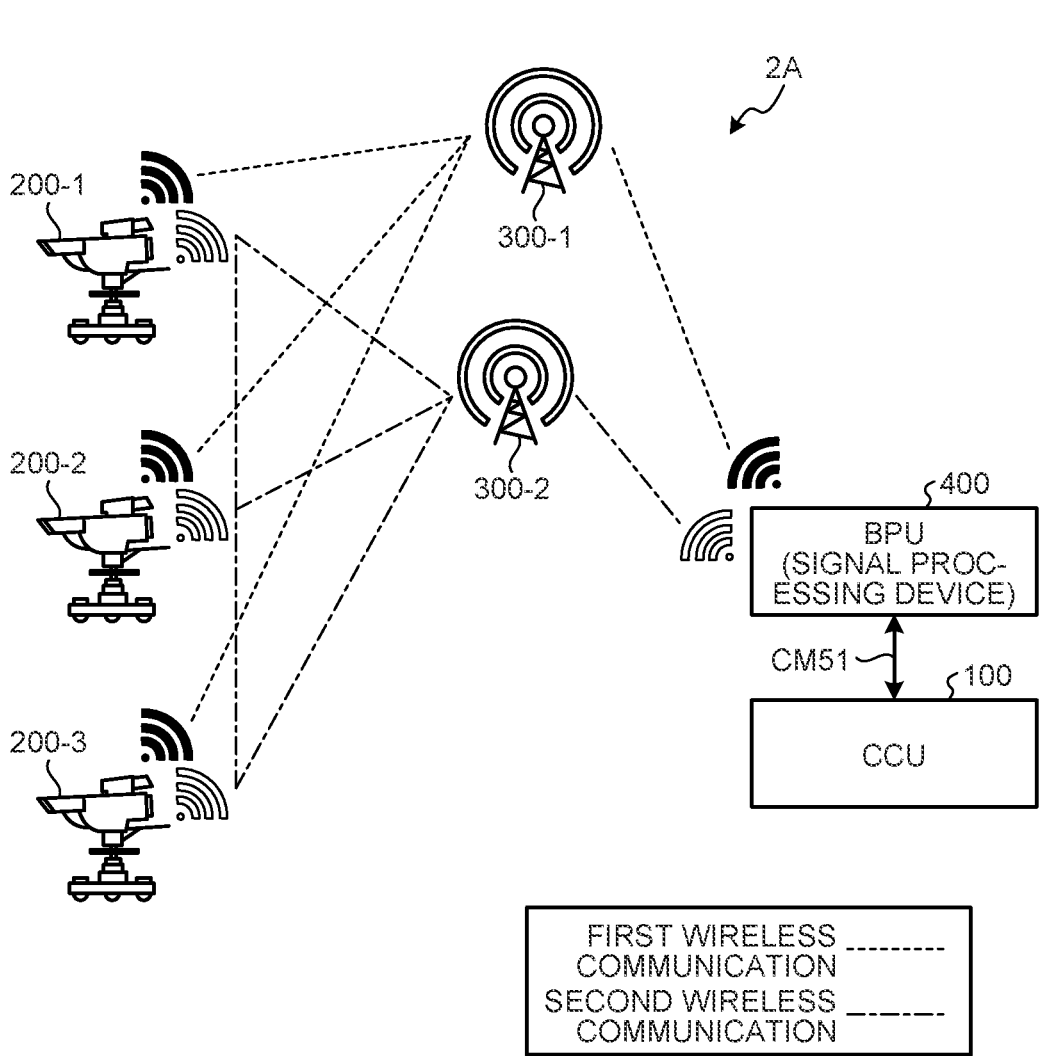
FIG. 17 is a diagram illustrating an example of a camera system and communication processing according to a sixth embodiment of the present disclosure.

6-1. Outline of Camera System and Communication Processing According to Sixth Embodiment of Present Disclosure Outline of the camera system and communication processing according to the sixth embodiment will be described with reference to FIG. 17. FIG. 17 is a diagram illustrating an example of the camera system and the communication processing according to the sixth embodiment of the present disclosure. A configuration of the camera system 2A illustrated in FIG. 17 will be described. As illustrated in FIG. 17, the camera system 2A includes the CCU 100, a plurality of CAMs 200, and the BPU 400. FIG. 17 illustrates a case where a wireless base station is interposed between the CAM 200 and the BPU 400.

In the camera system 2A, the first wireless communication is performed via the base station 300-1 which is the first base station. In the camera system 2A, the first wireless communication between the CAM 200 and the BPU 400 is performed via the base station 300-1 which is the first base station.

In the camera system 2A, the second wireless communication is performed via the base station 300-2 which is the second base station. In the camera system 2A, the second wireless communication between the CAM 200 and the BPU 400 is performed via the base station 300-2 which is the second base station.

Furthermore, the BPU 400 communicates with the CCU 100. The BPU 400 communicates various signals (information) such as the first signal and the second signal with the CCU 100. The BPU 400 transmits and receives various signals (information) such as the first signal and the second signal to and from the CCU 100 through communication CM51 in FIG. 17.

7. SEVENTH EMBODIMENT

While in the fifth embodiment and the sixth embodiment, the system configuration using one BPU 400 has been described, a plurality of BPUs 400 may be used. In a seventh embodiment, a camera system 2B including a plurality of BPUs 400 will be described. Note that description of points similar to those of the fifth embodiment and the sixth embodiment will be omitted as appropriate.

Figure 18:
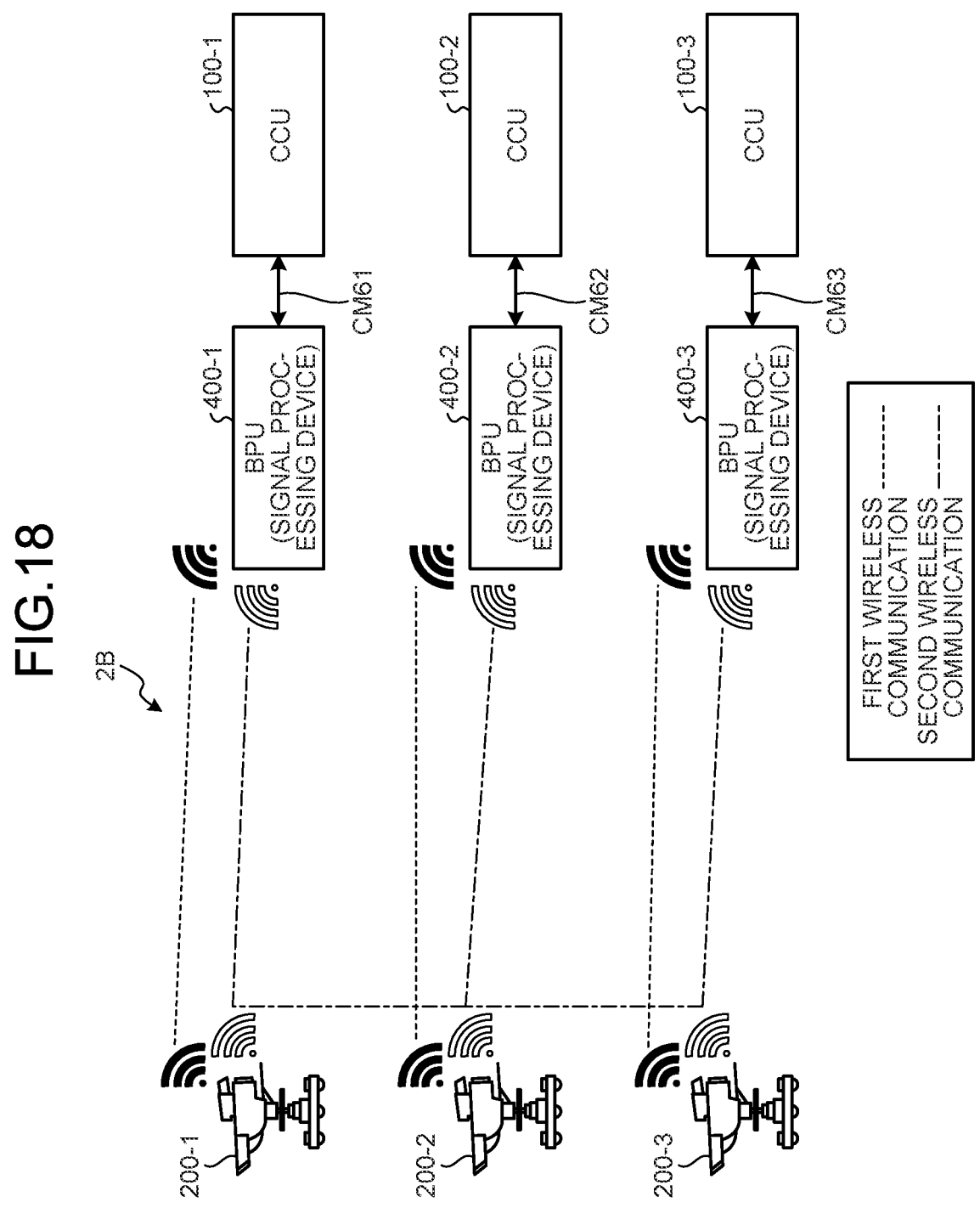
FIG. 18 is a diagram illustrating an example of a camera system and communication processing according to a seventh embodiment of the present disclosure.

7-1. Outline of Camera System and Communication Processing According to Seventh Embodiment of Present Disclosure Outline of the camera system and communication processing according to the seventh embodiment will be described with reference to FIG. 18. FIG. 18 is a diagram illustrating an example of the camera system and the communication processing according to the seventh embodiment of the present disclosure. As illustrated in FIG. 18, the camera system 2B includes a plurality of 100, a plurality of CAMs 200, and a plurality of BPUs 400. In a case where the CCU 100-1 to the CCU 100-3 and the like are described without being particularly distinguished, they are referred to as the CCU 100. In a case where a BPU 400-1 to a BPU 400-3 and the like are described without being particularly distinguished, they will be referred to as the BPU 400.

In the camera system 2B illustrated in FIG. 18, a configuration in which one CAM 200 is connected to one BPU 400, that is, a configuration in which the CAM and the BPU are connected on a one-to-one basis is illustrated. The BPU 400 according to the seventh embodiment is different from the BPU 400 according to the fifth embodiment and the BPU 400 according to the sixth embodiment in communicating with one CAM 200.

In the example of FIG. 18, the BPU 400-1 is wirelessly connected to the CAM 200-1. The CAM 200-1 transmits a signal (first signal) of the main line video to the BPU 400-1 through the first wireless communication. The BPU 400-1 receives the first signal from the CAM 200-1 through the first wireless communication. The CAM 200-1 transmits a signal (second signal) other than the first signal to the BPU 400-1 through the second wireless communication. The BPU 400-1 receives the second signal from the CAM 200-1 through the second wireless communication.

In addition, the BPU 400-1 communicates with the CCU 100-1. The BPU 400-1 communicates various signals (information) such as the first signal and the second signal with the CCU 100-1. 400-1 transmits and receives various signals (information) such as the first signal and the second signal to and from the CCU 100-1 through communication CM61 in FIG. 18. For example, the BPU 400-1 transmits and receives various signals (information) such as the first signal and the second signal to and from the CCU 100-1 through the communication CM61 which is wireless communication. Furthermore, for example, the BPU 400-1 transmits and receives various signals (information) such as the first signal and the second signal to and from the CCU 100-1 through the communication CM61 which is wired communication.

In the example of FIG. 18, the BPU 400-2 is wirelessly connected to the CAM 200-2. The CAM 200-2 transmits a signal (first signal) of the main line video to the BPU 400-2 through the first wireless communication. The BPU 400-2 receives the first signal from the CAM 200-2 through the first wireless communication. The CAM 200-2 transmits a signal (second signal) other than the first signal to the BPU 400-2 through the second wireless communication. The BPU 400-2 receives the second signal from the CAM 200-2 through the second wireless communication.

In addition, the BPU 400-2 communicates with the CCU 100-2. The BPU 400-2 communicates various signals (information) such as the first signal and the second signal with the CCU 100-2. 400-2 transmits and receives various signals (information) such as the first signal and the second signal to and from the CCU 100-2 through communication CM62 in FIG. 18. For example, the BPU 400-2 transmits and receives various signals (information) such as the first signal and the second signal to and from the CCU 100-2 through the communication CM62 which is wireless communication or wired communication.

In the example of FIG. 18, the BPU 400-3 is wirelessly connected to the CAM 200-3. The CAM 200-3 transmits a signal (first signal) of the main line video to the BPU 400-3 through the first wireless communication. The BPU 400-3 receives the first signal from the CAM 200-3 through the first wireless communication. The CAM 200-3 transmits a signal (second signal) other than the first signal to the BPU 400-3 through the second wireless communication. The BPU 400-3 receives the second signal from the CAM 200-3 through the second wireless communication.

In addition, the BPU 400-3 communicates with the CCU 100-3. The BPU 400-3 communicates various signals (information) such as the first signal and the second signal with the CCU 100-3. 400-3 transmits and receives various signals (information) such as the first signal and the second signal to and from the CCU 100-3 through communication CM63 in FIG. 18. For example, the BPU 400-3 transmits and receives various signals (information) such as the first signal and the second signal to and from the CCU 100-3 through the communication CM63 which is wireless communication or wired communication.

8. EIGHTH EMBODIMENT

While in the seventh embodiment, an example where the plurality of CCUs 100 is respectively associated with the plurality of BPUs 400 on an N-to-N basis has been described, one CCU 100 may be associated with the plurality of BPUs 400. In an eighth embodiment, a camera system 2C including one CCU 100 and a plurality of BPUs 400 will be described. Note that description of points similar to those of the seventh embodiment will be omitted as appropriate.

Figure 19:
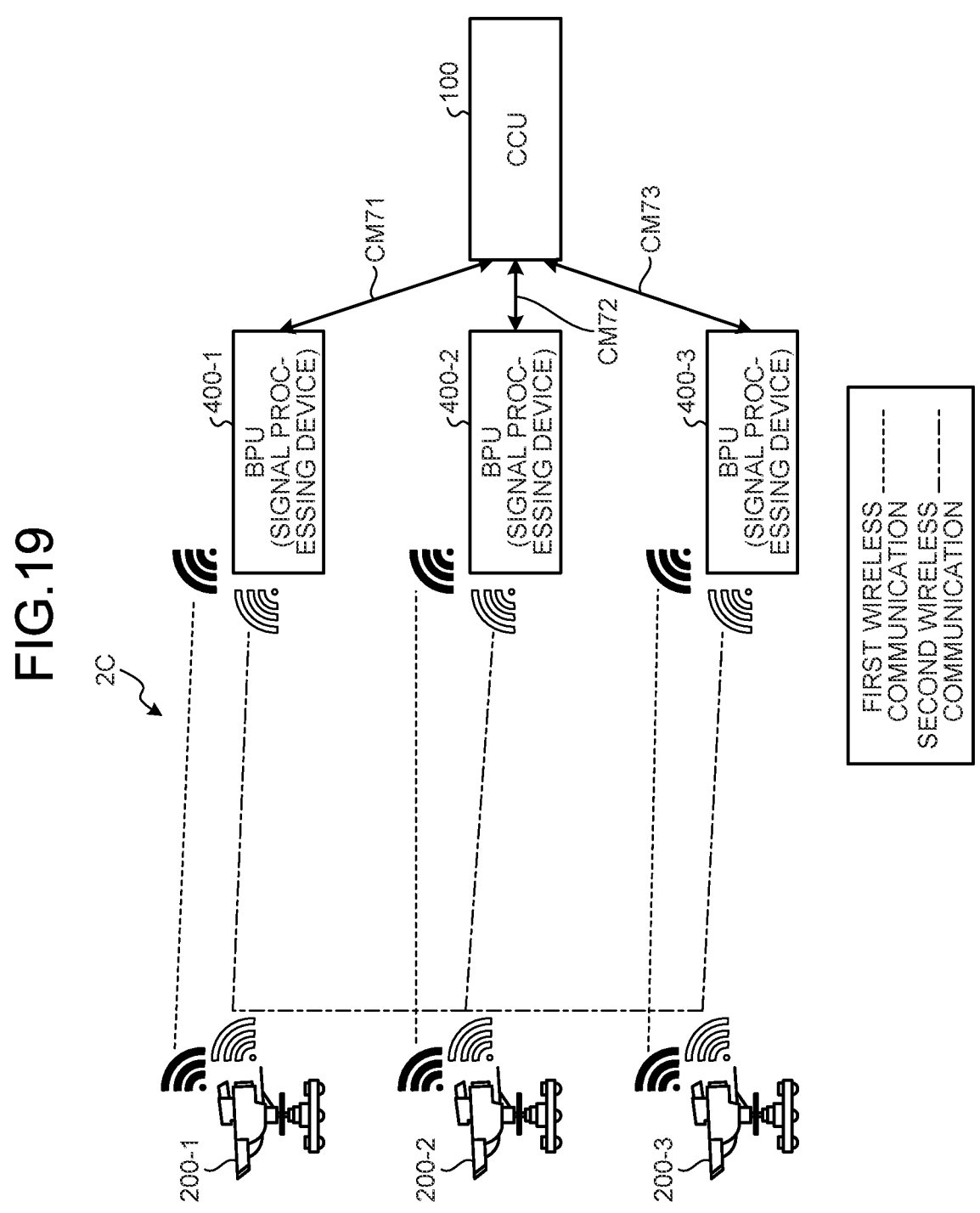
FIG. 19 is a diagram illustrating an example of a camera system and communication processing according to an eighth embodiment of the present disclosure.

8-1. Outline of Camera System and Communication Processing According to Eighth Embodiment of Present Disclosure Outline of the camera system and communication processing according to the eighth embodiment will be described with reference to FIG. 19. FIG. 19 is a diagram illustrating an example of the camera system and the communication processing according to the eighth embodiment of the present disclosure. As illustrated in FIG. 19, the camera system 2C includes the CCU 100, a plurality of CAMs 200, and a plurality of BPUs 400. In a case where the BPU 400-1 to the BPU 400-3 and the like are described without being particularly distinguished, they will be referred to as the BPU 400.

In the camera system 2C illustrated in FIG. 19, a configuration in which one CCU 100 is connected to a plurality of BPUs 400, that is, a configuration in which the BPU and the CCU are connected on an N-to-1 basis is illustrated. The camera system 2C according to the eighth embodiment is different from the camera system 2B according to the seventh embodiment in that one CCU 100 communicates with a plurality of BPUs 400.

In the example of FIG. 19, the BPU 400-1 communicates with the CCU 100. The BPU 400-1 communicates various signals (information) such as the first signal and the second signal with the CCU 100. 400-1 transmits and receives various signals (information) such as the first signal and the second signal to and from the CCU 100 through communication CM71 in FIG. 19. For example, the BPU 400-1 transmits and receives various signals (information) such as the first signal and the second signal to and from the CCU 100 through the communication CM71 which is wireless communication or wired communication.

In addition, the BPU 400-2 communicates with the CCU 100. The BPU 400-2 communicates various signals (information) such as the first signal and the second signal with the CCU 100. 400-2 transmits and receives various signals (information) such as the first signal and the second signal to and from the CCU 100 through communication CM72 in FIG. 19. For example, the BPU 400-2 transmits and receives various signals (information) such as the first signal and the second signal to and from the CCU 100 through the communication CM72 which is wireless communication or wired communication.

In addition, the BPU 400-3 communicates with the CCU 100. The BPU 400-3 communicates various signals (information) such as the first signal and the second signal with the CCU 100. 400-3 transmits and receives various signals (information) such as the first signal and the second signal to and from the CCU 100 through communication CM73 in FIG. 19. For example, the BPU 400-3 transmits and receives various signals (information) such as the first signal and the second signal to and from the CCU 100 through the communication CM73 which is wireless communication or wired communication.

9. NINTH EMBODIMENT

While in the seventh embodiment, an example where the plurality of CCUs 100 is respectively associated with the plurality of BPUs 400 on an N-to-N basis has been described, a plurality of CCUs 100 may be associated with one BPU 400. In a ninth embodiment, a camera system 2C including a plurality of CCUs 100 and one BPU 400 will be described. Note that description of points similar to those of the seventh embodiment will be omitted as appropriate.

Figure 20:
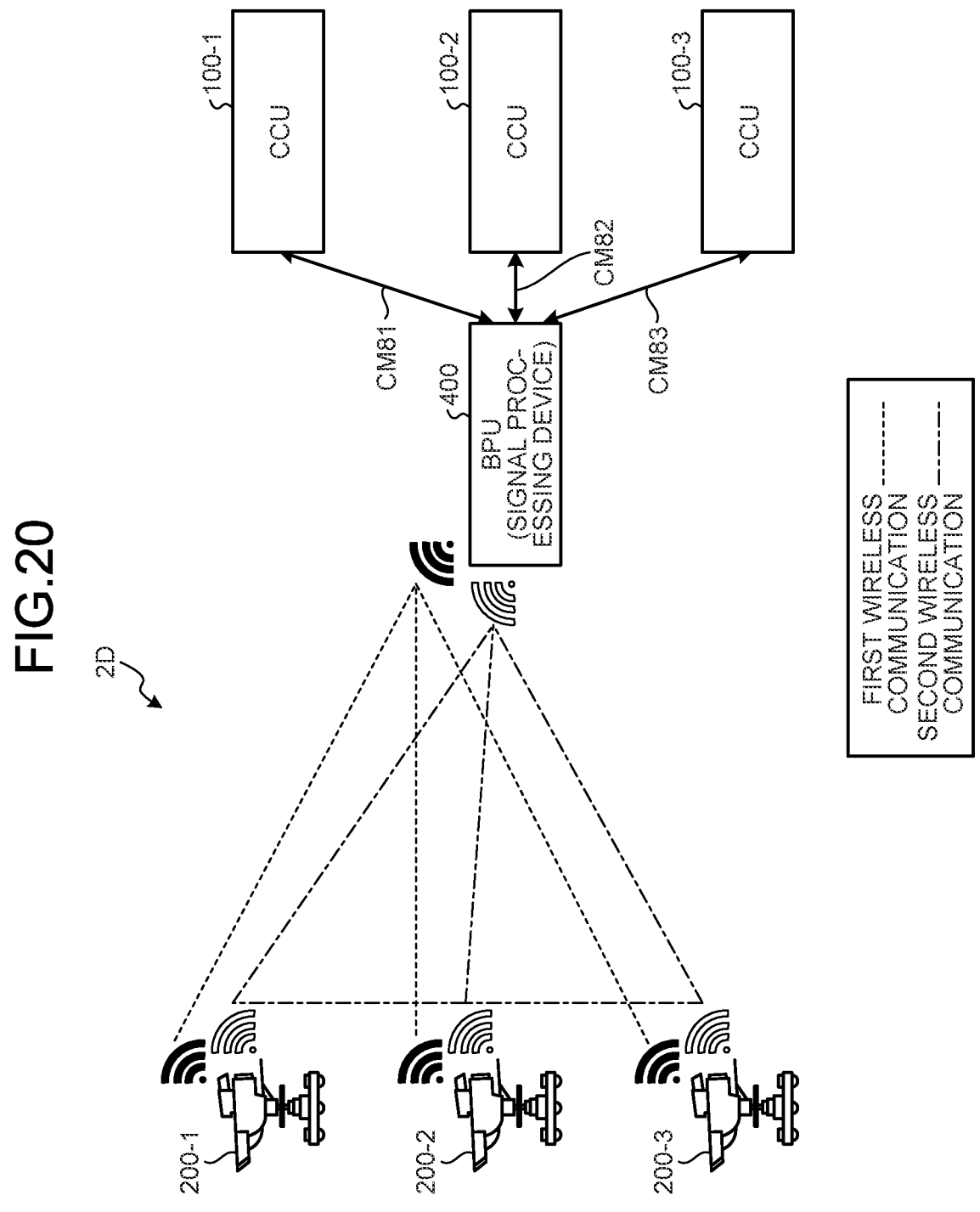
FIG. 20 is a diagram illustrating an example of a camera system and communication processing according to a ninth embodiment of the present disclosure.

9-1. Outline of Camera System and Communication Processing According to Ninth Embodiment of Present Disclosure Outline of the camera system and communication processing according to the ninth embodiment will be described with reference to FIG. 20. FIG. 20 is a diagram illustrating an example of the camera system and the communication processing according to the ninth embodiment of the present disclosure. As illustrated in FIG. 20, a camera system 2D includes a plurality of CCUs 100, a plurality of CAMs 200, and the BPU 400. In a case where the CCU 100-1 to the CCU 100-3 and the like are described without being particularly distinguished, they are referred to as the CCU 100.

In the camera system 2D illustrated in FIG. 20, a configuration in which a plurality of CAMs 200 and a plurality of CCUs 100 are connected to one BPU 400, that is, a configuration in which the CAN, the CCU, and the BPU are connected on an N-to-1 basis is illustrated. The camera system 2D according to the ninth embodiment is different from the camera system 2B according to the seventh embodiment in that one BPU 400 communicates with a plurality of CAMs 200 and a plurality of CCUs 100.

In the example of FIG. 20, the BPU 400 is wirelessly connected to the CAM 200-1. The CAM 200-1 transmits a signal (first signal) of the main line video to the BPU 400 through the first wireless communication. The BPU 400 receives the first signal from the CAM 200-1 through the first wireless communication. The CAM 200-1 transmits a signal (second signal) other than the first signal to the BPU 400 through the second wireless communication. The BPU 400 receives the second signal from the CAM 200-1 through the second wireless communication.

Furthermore, the BPU 400 communicates with the CCU 100-1. The BPU 400 communicates various signals (information) such as the first signal and the second signal with the CCU 100-1. 400-1 transmits and receives various signals (information) such as the first signal and the second signal to and from the CCU 100-1 through communication CM81 in FIG. 20. For example, the BPU 400 transmits and receives various signals (information) such as the first signal and the second signal to and from the CCU 100-1 through the communication CM81 which is wireless communication or wired communication.

In the example of FIG. 20, the BPU 400 is wirelessly connected to the CAM 200-2. The CAM 200-2 transmits a signal (first signal) of the main line video to the BPU 400 through the first wireless communication. The BPU 400 receives the first signal from the CAM 200-2 through the first wireless communication. The CAM 200-2 transmits a signal (second signal) other than the first signal to the BPU 400 through the second wireless communication. The BPU 400 receives the second signal from the CAM 200-2 through the second wireless communication.

Furthermore, the BPU 400 communicates with the CCU 100-2. The BPU 400 communicates various signals (information) such as the first signal and the second signal with the CCU 100-2. 400-2 transmits and receives various signals (information) such as the first signal and the second signal to and from the CCU 100-2 through communication CM82 in FIG. 20. For example, the BPU 400 transmits and receives various signals (information) such as the first signal and the second signal to and from the CCU 100-2 through the communication CM82 which is wireless communication or wired communication.

In the example of FIG. 20, the BPU 400 is wirelessly connected to the CAM 200-3. The CAM 200-3 transmits a signal (first signal) of the main line video to the BPU 400 through the first wireless communication. The BPU 400 receives the first signal from the CAM 200-3 through the first wireless communication. The CAM 200-3 transmits a signal (second signal) other than the first signal to the BPU 400 through the second wireless communication. The BPU

400 receives the second signal from the CAM 200-3 through the second wireless communication.

Furthermore, the BPU 400 communicates with the CCU 100-3. The BPU 400 communicates various signals (information) such as the first signal and the second signal with the CCU 100-3. 400-3 transmits and receives various signals (information) such as the first signal and the second signal to and from the CCU 100-3 through communication CM83 in FIG. 20. For example, the BPU 400 transmits and receives various signals (information) such as the first signal and the second signal to and from the CCU 100-3 through the communication CM83 which is wireless communication or wired communication.

10. OTHER EMBODIMENTS

The processing according to the embodiments described above may be performed in various different forms (modifications) other than the embodiments described above.

10-1. Other Configuration Examples

For example, while in the above-described example, a case where the CCU 100 and the BPU 400 are separately provided has been described, the CCU 100 and the BPU 400 may be integrated. In this case, the camera system may include a signal processing device having the functions of the CCU 100 and the BPU 400. For example, the camera system may include the CCU 100 having the functions of the BPU 400 and the CAM 200.

10-2. Others

Among the processing described in the above embodiments, all or part of the processing described as being performed automatically can be performed manually, or all or part of the processing described as being performed manually can be performed automatically by a known method. In addition, the processing procedure, specific name, and information including various data and parameters illustrated in the document and the drawings can be arbitrarily changed unless otherwise specified. For example, the various kinds of information illustrated in each figure are not limited to the illustrated information.

In addition, each component of each device illustrated in the drawings is functionally conceptual and is not necessarily physically configured as illustrated in the drawings. In other words, a specific form of distribution and integration of each device is not limited to the illustrated form, and all or a part thereof can be functionally or physically distributed and integrated in an arbitrary unit according to various loads, usage conditions, and the like.

In addition, the above-described embodiments and modifications can be appropriately combined within a range not contradicting processing content.

Furthermore, the effects described in the present specification are merely examples and are not limited, and other effects may be provided.

11. EFFECTS ACCORDING TO PRESENT DISCLOSURE

As described above, the camera system (in the embodiment, camera systems 1, 1A, 1B, 10, 2A, 2B, 2C, and 2D) according to the present disclosure includes the camera (the CAM 200 in the embodiment) and the signal processing device (in the embodiment, the CCU 100 and the BPU 400).

The camera has a wireless communication function and captures a video. The signal processing device has a function of wireless communication and performs signal processing related to the video captured by the camera. The camera and the signal processing device are wirelessly connected.

As described above, in the camera system according to the present disclosure, the camera and the signal processing device are wirelessly connected to each other, which allows the camera to be installed without being affected by a length of a cable, or the like, as in a case of wired connection, so that the degree of freedom in installation of the camera can be improved. The camera system improves the degree of freedom in installation of the camera, eliminates the need for another person to perform processing related to the cable other than the camera operator, and can improve the convenience of the user who uses the system.

In addition, the camera and the signal processing device communicate the first signal that is a signal of the video captured by the camera through the first wireless communication. The camera and the signal processing device communicate the second signal other than the first signal through the second wireless communication different from the first wireless communication. As described above, the camera system can improve the degree of freedom in installation of the camera while securing stable video communication by separating video communication from other communication. The camera system can secure stable connection regardless of the radio state of the main line video.

In addition, the first wireless communication is communication that satisfies at least one of a wider bandwidth than a bandwidth of the second wireless communication, higher reliability than reliability of the second wireless communication, or a lower delay than a delay of the second wireless communication. As described above, the camera system can perform video communication through the first wireless communication with higher quality by communicating the video through the first wireless communication that satisfies at least one of a wider bandwidth, higher reliability, or a lower delay than that of the second wireless communication. The camera system can secure stable connection regardless of the radio state of the second signal such as a synchronization signal.

The second signal is a signal related to imaging by the camera. As described above, the camera system can separate video communication from other communication by communicating a signal related to imaging by the camera through the second wireless communication and can provide communication in an appropriate communication mode according to the communication content.

Furthermore, the second signal is a signal to be used for controlling the camera. As described above, the camera system can provide communication in an appropriate communication mode according to the communication content by communicating the signal to be used for controlling the camera through the second wireless communication.

In addition, the second signal is a synchronization signal with another camera or a signal of a command for controlling the camera. As described above, the camera system can provide communication in an appropriate communication mode according to the communication content by communicating a synchronization signal with another camera or a signal of a command for controlling the camera through the second wireless communication.

In addition, the second signal is a signal to be used for information transmission between users who use the camera system. As described above, the camera system can provide communication in an appropriate communication mode according to the communication content by communicating the signal to be used for information transmission between the users who use the camera system through the second wireless communication.

Furthermore, the second signal is a RET image signal or an INCOM signal. As described above, the camera system can provide communication in an appropriate communication mode according to the communication content by communicating the RET image signal or the INCOM signal through the second wireless communication.

In addition, the second signal is a signal to be used for information transmission to the imaging subject by the camera. As described above, the camera system can provide communication in an appropriate communication mode according to the communication content by communicating the signal to be used for information transmission to the imaging subject by the camera through the second wireless communication.

The second signal is a TALLY signal or a prompter signal. As described above, the camera system can provide communication in an appropriate communication mode according to the communication content by communicating the TALLY signal or the prompter signal through the second wireless communication.

The camera is a plurality of cameras. The signal processing device and the plurality of cameras communicate with each other through the first wireless communication and the second wireless communication. As a result, the camera system can communicate between the plurality of cameras and the signal processing device through the first wireless communication and the second wireless communication. Thus, the camera system can wirelessly communicate even in a case where there is a plurality of cameras, so that the degree of freedom in installation of the cameras can be improved. The camera system can reduce operation cost at the site. The camera system can simplify a system architecture.

In addition, the plurality of cameras communicates with each other through the second wireless communication. As a result, the camera system can communicate between the plurality of cameras through the second wireless communication. Thus, the camera system can communicate the second signal between the cameras and can provide communication in an appropriate communication mode according to the communication content. The camera system can secure stable connection for a control signal (second signal) such as a synchronization signal. Furthermore, the camera system can exchange the RET image signal and the INCOM signal (second signal) only between the cameras, not via the signal processing device.

The plurality of cameras includes one master camera and slave cameras. The signal processing device transmits a control signal common to the plurality of cameras to one master camera. One master camera transmits a control signal to the slave cameras. As a result, the camera system can appropriately control each camera while preventing increase in communication load between the camera and the signal processing device. Thus, even in a case where there is a plurality of cameras, the camera system can provide communication in an appropriate communication mode according to the communication content. The camera system can improve utilization efficiency of the radio band.

In addition, the signal processing device identifies a manufacturer of the camera at the time of wireless connection with the camera. As a result, the camera system can perform wireless connection only between a camera of a manufacturer corresponding to the signal processing device and the signal processing device and can reduce erroneous connection with a camera or a signal processing device of another manufacturer.

In addition, the camera and the signal processing device confirm the state of wireless connection from the camera. As a result, the camera system can simplify polling processing such as confirmation of the wireless connection status and can reduce communication load. The camera system can reduce an amount of data at the time of polling. The camera system can shorten a period required for the system to restore.

Furthermore, the signal processing device includes a main body portion (the main body portion 101 in the embodiment) that performs signal processing, and an antenna unit (the antenna unit 160 in the embodiment) that is separated from the main body portion and performs wireless communication with the camera. As a result, the camera system can improve the degree of freedom in installation of the antenna of the signal processing device and can improve the degree of freedom in installation of the camera. The camera system enables optimization of an antenna position and can improve convenience of the user who uses the system.

In addition, the signal processing device includes a connector portion to be used for wired connection with another camera that performs wired communication. As a result, the camera system can also communicate between the camera that can communicate only in a wired manner and the signal processing device, so that the degree of freedom in installation of the camera can be improved. The camera system can maintain connection compatibility with non-wireless-compliant cameras.

As described above, the signal processing device (in the embodiment, the CCU 100 and the BPU 400) according to the present disclosure includes the wireless communication unit (the transmission signal processing unit 110 in the embodiment) and the signal processing unit (the video signal processing unit 120 in the embodiment). The wireless communication unit performs wireless communication with the camera that captures a video. The signal processing unit performs signal processing related to the video captured by the camera.

Accordingly, the signal processing device according to the present disclosure can wirelessly communicate with the camera, so that the degree of freedom in installation of the camera can be improved. Thus, the signal processing device can improve the degree of freedom in installation of the camera in the camera system using the signal processing device, eliminate the need for another person to perform processing related to the cable other than the camera operator, and improve the convenience of the user who uses the system.

As described above, the camera (the CAM 200 in the embodiment) according to the present disclosure includes the imaging unit (the imaging element 250 in the embodiment) and the wireless communication unit (the transmission signal processing unit 210 in the embodiment). The imaging unit captures a video. The wireless communication unit performs wireless communication with the signal processing device that performs signal processing related to the video.

Accordingly, the camera according to the present disclosure can wirelessly communicate with the signal processing device, so that the degree of freedom in installation of the camera can be improved. Thus, the camera system using the camera improves the degree of freedom in installation of the camera, eliminates the need of another person who performs processing related to the cable other than the camera operator, so that it is possible to improve the convenience of the user who uses the system.

12. HARDWARE CONFIGURATION

Figure 22:
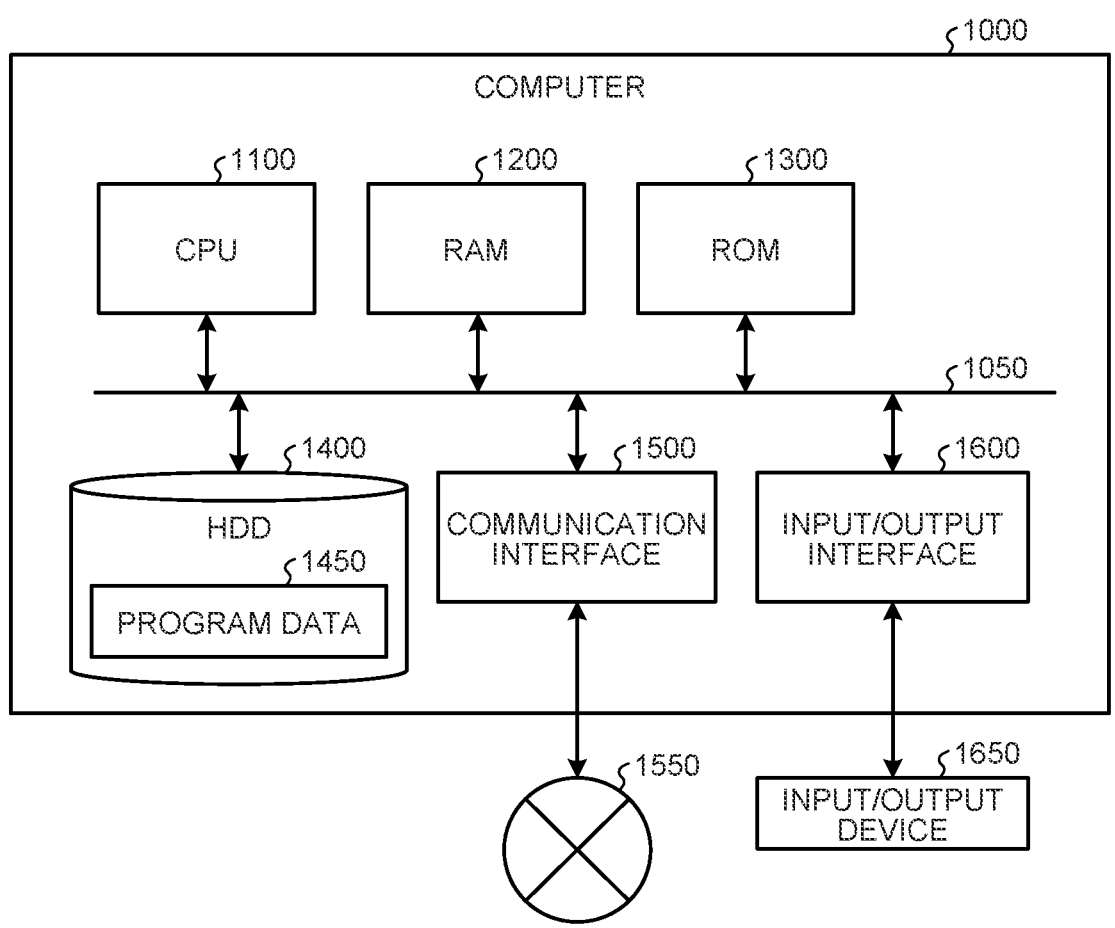
FIG. 22 is a hardware configuration diagram illustrating an example of a computer that implements functions of the signal processing device.

The signal processing device (information device) such as the CCU 100 and the BPU 400 according to the embodiments described above is implemented by a computer 1000 having a configuration as illustrated in FIG. 22, for example. FIG. 22 is a hardware configuration diagram illustrating an example of the computer 1000 that implements the functions of the signal processing device. Hereinafter, the CCU 100 will be described as an example. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected by a bus 1050.

The CPU 1100 operates on the basis of a program stored in the ROM 1300 or the HDD 1400 and controls the respective units. For example, the CPU 1100 develops programs stored in the ROM 1300 or the HDD 1400 in the RAM 1200 and executes processing corresponding to various programs.

The ROM 1300 stores a boot program such as a basic input output system (BIOS) to be executed by the CPU 1100 when the computer 1000 is activated, a program depending on hardware of the computer 1000, and the like.

The HDD 1400 is a computer-readable recording medium that non-transiently records a program to be executed by the CPU 1100, data to be used by the program, and the like. Specifically, the HDD 1400 is a recording medium that records an information processing program such as a signal processing program according to the present disclosure which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the CCU 100 according to the embodiment, the CPU 1100 of the computer 1000 executes the information processing program loaded on the RAM 1200 to implement the functions of the video signal processing unit 120, the control signal processing unit 130, and the like. In addition, the HDD 1400 stores an information processing program according to the present disclosure and data in a storage unit of the CCU 100. Note that the CPU 1100 reads the program data 1450 from the HDD 1400 and executes the program data 1450, but as another example, these programs may be acquired from another device via the external network 1550.

Note that the present technology can also have the following configurations.

(1)

A camera system comprising:

a camera having a wireless communication function and configured to capture a video; and a signal processing device having a wireless communication function and configured to perform signal processing related to the video captured by the camera, wherein the camera and the signal processing device are wirelessly connected.

(2)

The camera system according to (1), wherein the camera and the signal processing device communicate a first signal which is a signal of the video captured by the camera, through first wireless communication, and the camera and the signal processing device communicate a second signal other than the first signal through second wireless communication different from the first wireless communication.

(3)

The camera system according to (2), wherein the first wireless communication is communication that satisfies at least one of a wider bandwidth than a bandwidth of the second wireless communication, higher reliability than reliability of the second wireless communication, or a lower delay than a delay of the second wireless communication.

(4)

The camera system according to (2) or (3), wherein the second signal is a signal related to imaging by the camera.

(5)

The camera system according to (4)

wherein the second signal is a signal to be used for controlling the camera.

(6)

The camera system according to (5)

wherein the second signal is a synchronization signal with another camera or a signal of a command for controlling the camera.

(7)

The camera system according to (4)

wherein the second signal is a signal to be used for information transmission between users who use the camera system.

(8)

The camera system according to (7)

wherein the second signal is an RET image signal or an INCOM signal.

(9)

The camera system according to (4)

wherein the second signal is a signal to be used for information transmission to an imaging subject by the camera.

(10)

The camera system according to (9)

wherein the second signal is a TALLY signal or a prompter signal.

(11)

The camera system according to any one of (2) to (10), wherein the camera is a plurality of cameras, and the signal processing device and the plurality of cameras perform communication through the first wireless communication and the second wireless communication.

(12)

The camera system according to (11), wherein the plurality of cameras performs communication with each other through the second wireless communication.

(13)

The camera system according to (11) or (12), wherein the plurality of cameras includes one master camera and slave cameras, the signal processing device transmits a control signal common to the plurality of cameras to the one master camera, and the one master camera transmits the control signal to the slave cameras.

(14)

The camera system according to any one of (1) to (13), wherein the signal processing device identifies a manufacturer of the camera at the time of wireless connection with the camera.

(15)

The camera system according to any one of (1) to (14), wherein the camera confirms a wireless connection status between the camera and the signal processing device.

(16)

The camera system according to any one of (1) to (15), wherein the signal processing device comprises:

a main body portion that performs the signal processing; and an antenna unit that is separate from the main body portion and that performs wireless communication with the camera.

(17)

The camera system according to any one of (1) to (16), wherein the signal processing device comprises:

a connector portion to be used for wired connection with another camera that performs communication in a wired manner.

(18)

A communication method for wirelessly connecting:

a camera having a wireless communication function and configured to capture a video; and a signal processing device having a wireless communication function and configured to perform signal processing related to the video captured by the camera.

(19)

A signal processing device comprising:

a wireless communication unit configured to perform wireless communication with a camera that captures a video; and a signal processing unit configured to perform signal processing related to the video captured by the camera.

(20)

A camera comprising:

an imaging unit configured to capture a video; and a wireless communication unit configured to perform wireless communication with a signal processing device that performs signal processing related to the video.

REFERENCE SIGNS LIST

1 CAMERA SYSTEM
100 CCU (SIGNAL PROCESSING DEVICE)
101 MAIN BODY PORTION

110 TRANSMISSION SIGNAL PROCESSING UNIT (WIRELESS COMMUNICATION UNIT)

120 VIDEO SIGNAL PROCESSING UNIT (SIGNAL PROCESSING UNIT)

130 CONTROL SIGNAL PROCESSING UNIT (SIGNAL PROCESSING UNIT)

140 VIDEO INPUT/OUTPUT I/F UNIT

150 CONTROL SIGNAL I/F UNIT

160 ANTENNA UNIT

200 CAM (CAMERA)

210 TRANSMISSION SIGNAL PROCESSING UNIT (WIRELESS COMMUNICATION UNIT)

220 VIDEO SIGNAL PROCESSING UNIT

230 CONTROL SIGNAL PROCESSING UNIT

240 VIDEO INPUT/OUTPUT I/F UNIT

250 IMAGING ELEMENT (IMAGING UNIT)

The invention claimed is:

1. A camera system comprising:

a plurality of cameras, wherein each camera has a wireless communication function and is configured to capture a video; and a signal processing device having a wireless communication function, wherein the signal processing device is configured to perform signal processing related to the video captured by each camera, wherein each camera is wirelessly connected to the signal processing device, wherein each camera and the signal processing device communicate a respective first signal which is a signal of the video captured by the camera through first wireless communication, wherein each camera and the signal processing device communicate a respective second signal other than the first signal through second wireless communication different from the first wireless communication, wherein the signal processing device performs communication with each camera of the plurality of cameras through both the first wireless communication and the second wireless communication, wherein each camera of the plurality of cameras performs communication to transmit the respective second signal to each other camera of the plurality of cameras only through the second wireless communication, wherein the first wireless communication is communication with a lower delay than a delay of the second wireless communication, and wherein the second signal includes a signal configured to be transmitted to an imaging subject of the captured video to indicate which one or more cameras among the plurality of cameras capture video including the imaging subject.

2. The camera system according to claim 1, wherein the first wireless communication is communication that further satisfies at least one of a wider bandwidth than a bandwidth of the second wireless communication or higher reliability than reliability of the second wireless communication.

3. The camera system according to claim 1, wherein the second signal includes a signal related to imaging by each camera.

4. The camera system according to claim 3, wherein the second signal further includes a signal to be used for controlling at least one camera of the plurality of cameras.

5. The camera system according to claim 4, wherein the second signal further includes a synchronization signal with another camera or a signal of a command for controlling at least one camera of the plurality of cameras.

6. The camera system according to claim 3, wherein the second signal further includes a signal to be used for information transmission between users who use the camera system.

7. The camera system according to claim 6, wherein the second signal is a return image signal or a signal of a speech of a user.

8. The camera system according to claim 3, wherein the signal configured to be transmitted to the imaging subject to indicate which one or more cameras among the plurality of cameras capture the video including the imaging subject is transmitted by at least one camera of the plurality of cameras.

9. The camera system according to claim 8, wherein the second signal further includes a signal configured to be transmitted to the imaging subject including a prompter signal.

10. The camera system according to claim 1, wherein the plurality of cameras includes one master camera and slave cameras, wherein the signal processing device transmits a control signal common to the plurality of cameras to the one master camera, and wherein the one master camera transmits the control signal to the slave cameras.

11. The camera system according to claim 1, wherein the signal processing device identifies a manufacturer of the camera at a time of wireless connection with the camera.

12. The camera system according to claim 1, wherein each camera confirms a wireless connection status between the camera and the signal processing device.

13. The camera system according to claim 1, wherein the signal processing device comprises:

a main body portion that performs the signal processing; and an antenna that is separate from the main body portion and that performs wireless communication with the camera.

14. The camera system according to claim 1, wherein the signal processing device comprises:

a connector portion configured for wired connection with another camera that performs communication in a wired manner.

15. The camera system according to claim 1, wherein a communication path of the second signal between the plurality of cameras is a direct communication path without passing through the signal processing device.

16. The camera system according to claim 1, wherein each camera of the plurality of cameras further performs communication to receive the respective second signal from each other camera of the plurality of cameras only through the second wireless communication.

17. A communication method for wirelessly connecting a plurality of cameras, each camera having a wireless communication function and being configured to capture a video, and a signal processing device having a wireless communication function and being configured to perform signal processing related to the video captured by the camera, the method comprising:

communicating, between each camera and the signal processing device, a respective first signal which is a signal of the video captured by each camera through first wireless communication; and communicating, between each camera and the signal processing device, a respective second signal other than the first signal through second wireless communication different from the first wireless communication, wherein the signal processing device performs communication with each camera of the plurality of cameras through both the first wireless communication and the second wireless communication, wherein each camera of the plurality of cameras performs communication to transmit the respective second signal to each other camera of the plurality of cameras only through the second wireless communication, wherein the first wireless communication is communication with a lower delay than a delay of the second wireless communication, and wherein the second signal includes a signal configured to be transmitted to an imaging subject of the captured video to indicate which one or more cameras among the plurality of cameras capture video including the imaging subject.

18. A signal processing device comprising:

circuitry configured to perform wireless communication with each camera of a plurality of cameras configured to capture a video, and perform signal processing related to the video captured by the camera, wherein the signal processing device performs communication with each camera of the plurality of cameras through both first wireless communication and second wireless communication different from the first wireless communication, wherein each camera of the plurality of cameras performs communication to transmit a respective signal to each other camera of the plurality of cameras only through the second wireless communication, wherein the first wireless communication is communication with a lower delay than a delay of the second wireless communication, and wherein the second signal includes a signal configured to be transmitted to an imaging subject of the captured video to indicate which one or more cameras among the plurality of cameras capture video including the imaging subject.

19. A camera comprising:

circuitry configured to capture a video, perform wireless communication with a signal processing device that performs signal processing related to the video, and perform wireless communication with at least one other camera configured to capture the video, wherein the signal processing device performs communication with the camera and each other camera through both first wireless communication and second wireless communication different from the first wireless communication, wherein the camera performs wireless communication with each camera of the at least one other camera to transmit a respective signal only through the second wireless communication, wherein the first wireless communication is communication with a lower delay than a delay of the second wireless communication, and wherein the second signal includes a signal configured to be transmitted to an imaging subject of the captured video to indicate which one or more cameras among the plurality of cameras capture video including the imaging subject.

* * * * *